US010032017B2

(12) United States Patent
Ravi et al.

(10) Patent No.: US 10,032,017 B2
(45) Date of Patent: Jul. 24, 2018

(54) METHODS AND SYSTEMS FOR ENABLING, TRACKING, AND CORRELATING ANONYMOUS USER ACTIVITY

(71) Applicant: Zynga Inc., San Francisco, CA (US)

(72) Inventors: Rohith Ravi, San Francisco, CA (US); Joy Ghanekar, San Francisco, CA (US); Dorion Carroll, Oakland, CA (US)

(73) Assignee: Zynga Inc., San Francisco, CA (US)

( * ) Notice: Subject to any disclaimer, the term of this patent is extended or adjusted under 35 U.S.C. 154(b) by 135 days.

(21) Appl. No.: 14/810,365

(22) Filed: Jul. 27, 2015

(65) Prior Publication Data

US 2015/0332042 A1 Nov. 19, 2015

Related U.S. Application Data

(62) Division of application No. 13/663,369, filed on Oct. 29, 2012, now Pat. No. 9,104,851.

(60) Provisional application No. 61/554,959, filed on Nov. 2, 2011.

(51) Int. Cl.
*H04L 9/32* (2006.01)
*G06F 21/31* (2013.01)
*G06F 21/33* (2013.01)
*G06F 21/45* (2013.01)

(52) U.S. Cl.
CPC ............ *G06F 21/45* (2013.01); *G06F 21/316* (2013.01); *G06F 21/33* (2013.01)

(58) Field of Classification Search
CPC ..... H04L 9/32; H04L 9/08; H04L 12/56; H04L 47/24
USPC .......................................................... 713/171
See application file for complete search history.

(56) References Cited

U.S. PATENT DOCUMENTS 6,226,788 B1 * 5/2001 Schoening .......... H04L 41/0213
709/203
2011/0238437 A1 * 9/2011 Zhou ................... G06F 19/3487
705/2

* cited by examiner

*Primary Examiner* — Tu Nguyen
(74) *Attorney, Agent, or Firm* — Martine Penilla Group, LLP

(57) ABSTRACT

Methods are disclosed for identity key management in networked application execution. In one embodiment, an identifier request is transmitted from a client system to a server system, in which an identity key value in the identifier request is blank. Upon detecting the blank identity key value at the server system, the server system operates to generate a new identity key value and an identifier for the new identity key value. The new identity key value and the identifier for the new identity key value are transmitted from the server system to the client system. The new identity key value is stored in a local store of the client system. The local store of the client system is secured by a passcode and persists data through power cycling of the client system. The identifier is used to track execution of a networked application in an anonymous execution mode.

20 Claims, 18 Drawing Sheets

METHODS AND SYSTEMS FOR ENABLING, TRACKING, AND CORRELATING ANONYMOUS USER ACTIVITY

CLAIM OF PRIORITY

This application is a divisional application under 35 U.S.C. 121 of prior U.S. aplication Ser. No. 13/663,369, filed Oct. 29, 2012, which claims priority under 35 U.S.C. 119(e) to U.S. Provisional Patent Application No. 61/554,959, filed Nov. 2, 2011. The disclosure of each above-identified patent application is incorporated herein by reference in its entirety.

BACKGROUND

In modem on-line game play, an on-line game requires a user, i.e., player, to register with a corresponding game server to enable storage of the user's game state in an identified manner and to enable retrieval and provision of a stored game state based on the user's identity. For example, registration of a user of a given on-line game can be implemented through a registration interface sourced by the corresponding game server, in which the user is required to provide a username and password to enable saving of the user's current game state. With the provided username and password, the game server can store the user's game state for later retrieval and continued game play. Although registration of a user is generally advantageous for both the game developer and the user, there are instances when credentialed registration of a user for a given game is not of interest to the user. It is within this context that the present invention arises.

SUMMARY

In one embodiment, a method is disclosed for identity key management in networked application execution. The method includes transmitting an identifier request from a client system to a server system, wherein an identity key value in the identifier request is blank. Upon detecting the blank identity key value at the server system, the method includes operating the server system to generate a new identity key value and an identifier for the new identity key value. The new identity key value and the identifier for the new identity key value are transmitted from the server system to the client system. The method further includes storing the new identity key value in a local store of the client system. The local store of the client system is secured by a passcode. The new identity key value remains stored in the local store of the client system through power cycling of the client system. The identifier is used to track execution of a networked application.

In one embodiment, a method is disclosed for identity key management in networked application execution. The method includes obtaining an identity key value from a local store of a client system. The local store of the client system is secured by a passcode. The identity key value remains stored in the local store of the client system through power cycling of the client system. The method also includes transmitting an identifier request from the client system to a server system. The identity request includes the identity key value obtained from the local store of the client system. Upon detecting the identity key value at the server system, the method includes operating the server system to obtain an identifier corresponding to the identity key value from an identifier storage. The method further includes transmitting the identity key and the corresponding identifier from the server system to the client system. The identifier is used to track execution of a networked application.

In one embodiment, a method is disclosed for identity key management in networked application execution. The method includes executing a networked application on a client system in an anonymous execution mode. The method also includes tracking execution of the networked application through a first identifier associated with the anonymous execution mode on the client system. The method further includes connecting to a social network on the client system, whereby a second identifier associated with the social network is generated. The method also includes tracking execution of the networked application through both the first identifier associated with the anonymous execution mode on the client system and the second identifier associated with the social network.

Other aspects and advantages of the invention will become more apparent from the following detailed description, taken in conjunction with the accompanying drawings, illustrating by way of example the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Client-Server Architecture

Computer-implemented games are a popular form of entertainment. Some games are desktop-based that may be run on individual computing devices as standalone applications. Some games are network-based. A network-based game typically includes one or more server components that are run on a server system and one or more client components that are run on a client system associated with a player of the game.

In particular embodiments, a player of the network-based game may control the game's progress at the client system by inputting commands to the game at the client system. The client components may be responsible for receiving inputs from the player, executing game logic, changing the state of one or more world or player state parameters of the game, transmitting user inputs or other events to the server components running on the server system, receiving instructions from the server components, and displaying outputs of the game on the client device. For example, each time a player provides an input to the game through the client components at the client device (e.g., the player types on the keyboard or clicks the mouse of the client device), the client components of the game may need to transmit the player's input to the server components running on the server system.

The server components may provide backend support for the client components and may be responsible for maintaining application data of the game, processing the inputs from the player, updating and/or synchronizing the game state based on the game logic and each input from the player, and transmitting instructions to the client components. Therefore, it should be appreciated that a network-based game may require its server and client components to communicate with each other frequently in order to coordinate their respective functionalities.

Figure 1:
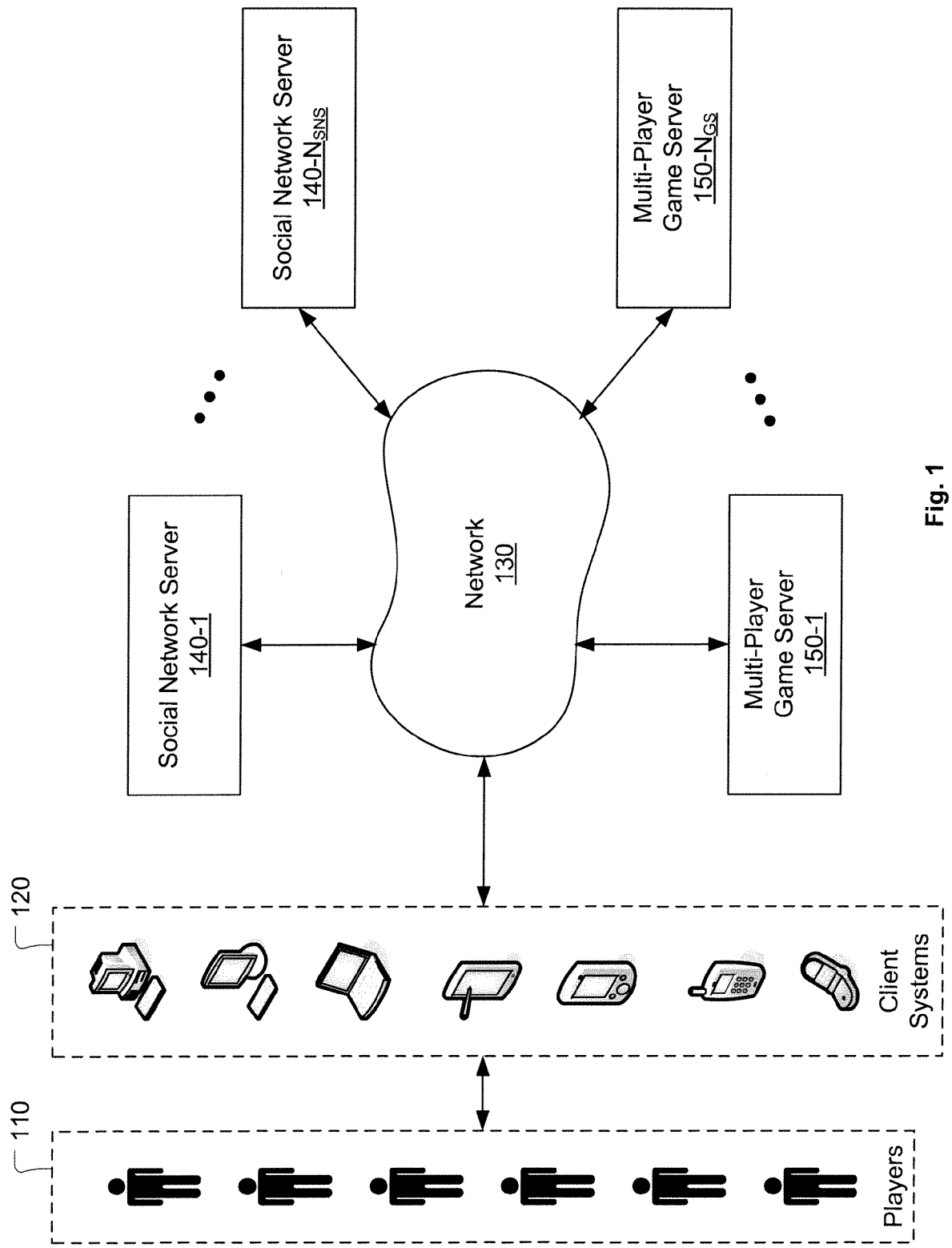
FIG. 1 shows an example client-server system within which various features of the present invention may be implemented, in accordance with one embodiment of the present invention.

FIG. 1 shows an example client-server system 100 within which various features of the present invention may be implemented, in accordance with one embodiment of the present invention. The system 100 can be used to facilitate or operate an application or a multi-user application. In one embodiment, the application is a game, and the user of the game is referred to as player. It should be understood that the embodiments disclosed herein can be applied to non-game applications and/or game applications. Also, in the case of non-game applications, the entity accessing and operating the non-gate application is referred to as the user of the application. In the case of game applications, the entity accessing and operating the game application is referred to as the player of the game. Therefore, it should be understood that the terms application and game are synonymous within the present disclosure. Also, it should be understood that the terms user and player are synonymous within the present disclosure. Additionally, it should be understood that each of the terms "user" and "player," as used herein, can refer to an individual person, a group of people, or an entity (such as a business or third party application). Generally speaking, the terms "user" and "player" refer to an entity capable of interacting with an application.

In particular embodiments, multiple players 110 using corresponding client systems 120 may connect to and communicate through a network 130. Client systems 120 may be any device capable of connecting to the network 130 such as, for example and without limitation, a personal computer, a smart phone, a mobile phone, a net book, a handheld gaming device, among others. The network 130 can be defined as any type of electronic communication network, including but not limited to a wireless network, a wired network, or a combination of wireless and wired networks, such as the Internet, a cellular network, a wide-area-network, and/or a local-area-network, among others.

The client systems 120 are defined and connected to communicate through the network 130 with a number of social network servers 140-1 through 140-$N_{SNS}$. The client systems 120 are also defined and connected to communicate through the network 130 with a number of multi-player game servers 150-1 through 150-$N_{GS}$. It should be understood that any number of social network servers ($N_{SNS}$) and any number of multi-player game servers ($N_{GS}$) can be connected to the network 130.

In some embodiments, one or more of the social network servers (140-1 through 140-$N_{SNS}$) can include an internal multi-player game server. Also, in some embodiments, one or more of the multi-player game servers (150-1 through 150-$N_{GS}$) can include an internal social network server. Additionally, in some embodiments, the social network servers (140-1 through 140-$N_{SNS}$) and multi-player game servers (150-1 through 150-$N_{GS}$) are defined and connected to communicate with each other through the network 130. In some embodiments, one or more of the multi-player game servers (150-1 through 150-$N_{GS}$) can include a PHP (Hypertext Preprocessor) server. Also, each of the multi-player game servers (150-1 through 150-$N_{GS}$) can include a game engine for any and all multi-player games hosted or operated thereon.

Any given multi-player game server (150-1 through 150-$N_{GS}$) can include computer readable code stored on a computer readable medium configured to be executed on a processor of the given multi-player game server so as to implement one or more multi-player games including various features described herein. The multi-player game servers (150-1 through 150-$N_{GS}$) can load computer readable code for individual games from the computer readable medium into a computer memory and then execute the games from the code stored in the computer memory. Additionally, one or more of the multi-player game servers (150-1 through 150-$N_{GS}$) can be defined to simultaneously execute, i.e., run, a plurality of multi-player games. In some embodiments, a given multi-player game server (150-1 through 150-$N_{GS}$) can be configured to access social graphs for players 110 stored on one or more of the social network servers (140-1 through 140-$N_{SNS}$). In some embodiments, information extracted from such social graphs (e.g., a player's social contacts) may be incorporated in the game logic of specific games and may be used to determine the current state of a game. Also, in some embodiments, different multi-player game servers (150-1 through 150-$N_{GS}$) can be configured to access social graphs for players 110 stored on each other.

Players 110 can use the client systems 120 to access, send data to, and receive data from the social network servers (140-1 through 140-$N_{SNS}$) and/or the multi-player game servers (150-1 through 150-$N_{GS}$) over the network 130. In some embodiments, the client systems 120 may download and store game data from the various multi-player game servers (150-1 through 150-$N_{Gs}$). In some embodiments, the game data downloaded to the client systems 120 can include information to enable various levels of off-line game play.

In particular embodiments, a computed-implemented game may be a text-based or turn-based game implemented as a series of web pages that are generated after a player 110 selects one or more actions to perform. The web pages may be displayed in a web browser executed on the player's 100 client system 120. In one such embodiment, a client application downloaded to a client system 120 may operate to serve a set of web pages to the web browser executed on the player's 100 client system 120. In some embodiments, a computer-implemented game may be an animated or rendered game executable as a stand-alone application or within the context of a web page or other structured document. In some embodiments, a computer-implemented game may be implemented using ADOBE FLASH-based technologies. For example, a game may be fully or partially implemented as a SWF object that is embedded in a web page and executable by a FLASH media player plug-in to the player's web browser. In various example embodiments, one or more described web pages may be associated with a networking system or networking service. However, other embodiments may include applications which retrieve and render structured documents hosted by any type of network addressable resource or web site.

Anonymous Play Embodiments

An on-line game may provide for registration of a user, i.e., player, with a corresponding game server to enable storage of the user's game state in an identified manner and to enable retrieval and provision of a stored game state based on the user's registered identity. However, in some instances, registration of a user for a given game is not of interest to the user and creates friction for game play by the user. Methods for anonymous play are disclosed herein by which a user can play a given on-line game in an anonymous manner and be provided with the benefits of having a stored and retrievable game state.

In disclosing the methods for anonymous play herein, a number of terms are used, including:

SNID: Social Network Identifier. A SNID is a unique identifier for a given social network as assigned by the game server. As disclosed herein, an "anonymous" social network is also assigned a SNID by the game server.

SNUID: Social Network Unique Identifier. A SNUID is a unique identifier for a given user within a given social network.

DID: Developer Identifier. For the developer Zynga Inc., the DID is referred to as ZID meaning Zynga Identifier. The ZID is generated as function of the SNID and the SNUID, i.e., ZID{SNID, SNUID, . . . }. In one embodiment, a ZID is generated as a function of only the SNID and the SNUID. In another embodiment, a ZID is generated as a function of the SNID, the SNUID, and one or more additional parameters and/or data. A ZID can be mapped to one or more other ZIDs on the server side of the client-server architecture.

In one embodiment, provision of game services and game reporting requires that each user have a ZID. Therefore, to enable anonymous play, it is necessary to generate a ZID for an anonymous user. The ZID for anonymous play is referred to hereafter as AnonZID. The methods for anonymous play as disclosed herein provide for generation and utilization of an AnonZID so as to enable the following features:

Maintain security of the user's identity, i.e., of the AnonZID.

Allow multiple applications by a given developer on the same client system to share the same AnonZID.

Support restoration of a saved game state after deleting and re-installing the corresponding application on the client system.

Provide a clean game state after resetting the client system.

Provide for preservation of a game state when a user transitions from anonymous play to social network connected play.

Provide for preservation of a game state when a user transitions from social network connected play to anonymous play.

Allow a user to play from a given game state on multiple client systems.

Provide support for all standard play mode game specific reporting and cross-game reporting when operating in anonymous play mode.

Seed Identifier and Local Store

For mobile client systems, such as smartphones, each game application has an application identifier assigned by the client system manufacturer. For example, in the case of iOS games for the IPHONE client system by APPLE, INC., an application identifier for a given game has two parts: 1) a seed identifier generated by APPLE, INC., and 2) an application identifier defined by the developer of the given game. In one embodiment, the seed identifier can be used by a developer to access a portion of a local store on the mobile client system that is assigned to the developer. The local store is a persistent storage medium, i.e., memory, present on the mobile client system in which data can be stored and maintained in an unaltered state through power cycling until the mobile client system is reset.

As used herein, the term local store refers to a memory area on a client system in which data is data is stored and maintained through power cycling of the client system until the reset operation is performed on the client system. Also, as used herein, the term seed identifier refers to an identifier used to access the local store of the client system to enable storing of data in the local store, modifying data in the local store, deleting data from the local store, and reading data from the local store. It should understood that the seed identifier provides the developer with access to their portion of the local store, but does not provide access to other portions of the local store that are not associated with the developer.

User BLOB

In one embodiment, an instance of a given game can be persistently stored as a set of game state parameters that characterize the state of various game objects, such as player character state parameters, non-player character parameters, and world state parameters. In one embodiment, game state is maintained in a database as a serialized, unstructured string of text data as a so-called Binary Large Object (BLOB). When a player accesses a game server to play a game, the BLOB containing the game state for the instance corresponding to the user is transmitted to the client system for use by a client-side executable game. In one embodiment, the client-side executable game may be a FLASH(r)-based game, which can de-serialize the game state data in the BLOB.

As the user plays the game, the game logic executed at the client is defined to maintain and modify the various game state parameters locally. In one embodiment, the client-side game logic may also batch game events, such as mouse clicks, and transmit these events to a remote game server. The remote game server can operate to retrieve a copy of the BLOB from a database or an intermediate memory cache (memcache) layer. The remote game server can also de-serialize the BLOB to resolve the game state parameters and execute its own game logic based on the events in the batch file of events transmitted by the client to synchronize the game state on the server side. The remote game server may then re-serialize the game state, now modified, into a BLOB and pass this to a memory cache layer for subsequent updating to a persistent database.

In particular embodiments, when a user plays a network-based game on a client system associated with the user, a game server hosting the game may serialize all the game-related data, including, for example and without limitation, game states, game events, user inputs, for this particular user and this particular game into a BLOB and store the BLOB in a database associated with the game server. The BLOB may be associated with an identifier that indicates that the BLOB contains the serialized game-related data for this particular user and this particular game. In particular embodiments, while the user is not playing the game, the corresponding BLOB may be stored in the database. This enables the user to stop playing the game at any time without losing the current state of the game associated with the user's play. When the user resumes playing the game next time, the game server may retrieve the corresponding BLOB from the database to determine the most-recent values of the game-related data. In particular embodiments, while the user is playing the game, the game server may also load the corresponding BLOB into a memory cache so that the game server may have faster access to the BLOB and the game-related data contained therein, thus improving the performance of the game, since accessing data stored in a memory cache is much faster than accessing data stored in a database.

Anonymous Play with First Time Installation of Application by Developer

Figure 2:
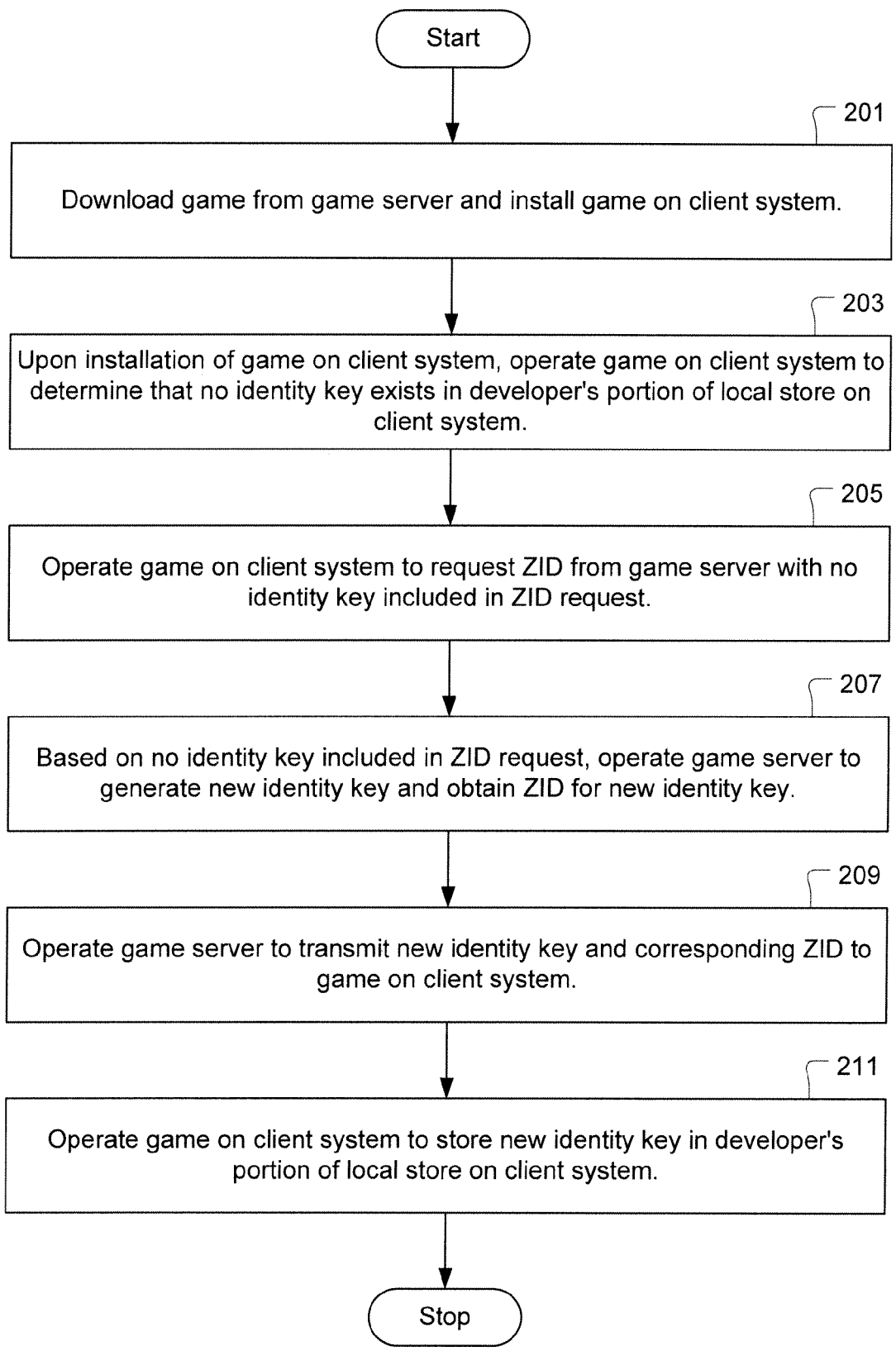
FIG. 2 shows a flowchart of a method for generating a ZID for anonymous play of a given application (AnonZID), when the given application is first installed on the client system and when no other application by a developer of the given application has been previously installed on the client system, in accordance with one embodiment of the present invention.

FIG. 2 shows a flowchart of a method for generating a ZID for anonymous play of a given application (AnonZID), when the given application is first installed on the client system and when no other application by a developer of the given application has been previously installed on the client system, in accordance with one embodiment of the present invention. The method includes an operation 201 in which the game is downloaded from its game server and installed on the client system. Upon installation of the game on the client system, the method includes an operation 203 for operating the game on the client system to determine that a global identity key does not exist in the game developer's portion of the local store on the client system. In operation 203, the game installed on the client system uses the seed identifier that is assigned to the game's developer by the manufacturer of the client system to access the developer's portion of the local store on the client system. Because this is the first game by the developer to be installed on the client system, the developer's portion of the local store is empty. Hence, the global identity key does not exist in the developer's portion of the local store.

The method continues with an operation 205 in which the game installed on the client system is operated to request a ZID from the game server. If the global identity key was present in the developer's portion of the local store, the ZID request would include that global identity key. However, because there is no global identity key available in the local store of the client system, the ZID request in operation 205 includes a blank value for the global identity key. In an operation 207, the game server receives the ZID request from the game installed on the client system and recognizes that there is no global identity key present in the ZID request. Based on the absence of the global identity key in the ZID request, operation 207 further includes operating the game server to generate a new global identity key and obtain a ZID for the new global identity key.

More specifically, in one embodiment of operation 207, the game server is operated to generate a random string as the new global identity key. The game server then requests a direct application programming interface (DAPI) to return a ZID corresponding to the new global identity key. The DAPI performs a lookup for the new global identity key in a ZID database and does not find a ZID based on the new global identity key. It should be understood that the new global identity key in this instance is considered an identity key for an anonymous social network. Therefore, the ZID for the new global identity key is a function of the new global identity key and a SNID of the anonymous social network. For example, if the new global identity key was generated as a random string equal to "GT73K89UI" and the SNID of the anonymous social network equals 24, then the ZID for the new global identity key is a function of global identity key="GT73K89UI" and SNID=24. Because DAPI does not find a ZID based on the new global identity key, DAPI functions to generate a new ZID based on a hash of the new global identity key and SNID=24 of the anonymous social network. This new ZID for the anonymous social network is referred to as AnonZID. The DAPI then returns the AnonZID to the game server.

From operation 207, the method continues with an operation 209 in which the game server transmits the new global identity key and the corresponding AnonZID to the game on the client system. Then, in an operation 211, the game on the client system is operated to store the new global identity key in the developer's portion of the local store on the client system. In this manner, the global identity key corresponding to the AnonZID can be used by the game next time it is loaded on the client system for anonymous play. Also, the global identity key corresponding to the AnonZID can be used by other applications when they are installed on the client system. The game uses the AnonZID to obtain a saved game state from the game server and make tracking calls.

Figure 3:
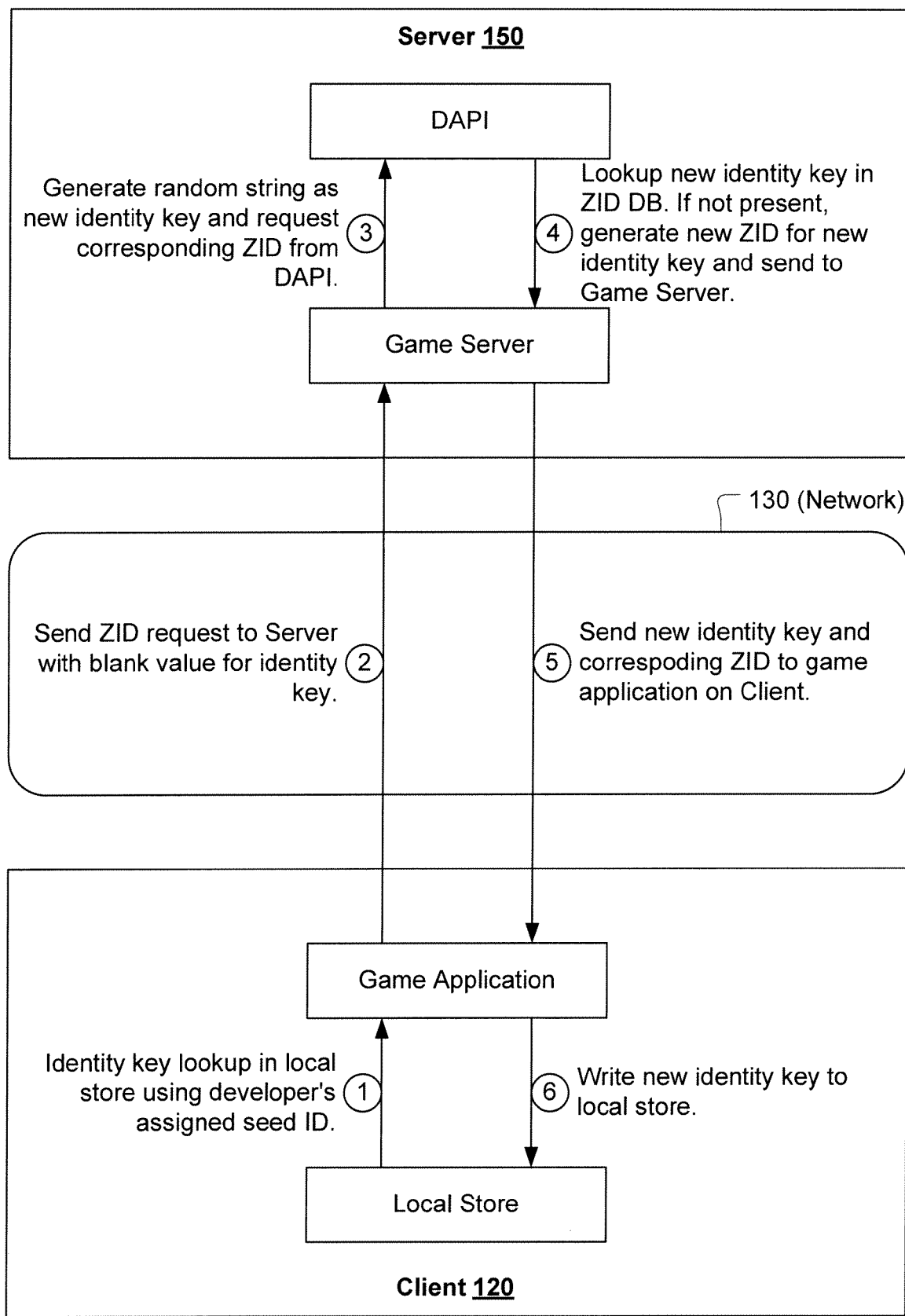
FIG. 3 shows a system flow diagram for the method of FIG. 2, in accordance with one embodiment of the present invention.

FIG. 3 shows a system flow diagram for the method of FIG. 2, in accordance with one embodiment of the present invention. In accordance with operation 203, the game on the client system 120 checks the local store to determine whether or not the global identity key is present in the game developer's portion of the local store, as indicated by arrow 1. Upon determining that the global identity key is not present in the local store, the game proceeds with the operation 205 to transmit a ZID request to the game server on the server system 150, with a blank value for the global identity key included in the ZID request, as indicated by arrow 2. Upon receiving the ZID request, the game server proceeds with operation 207 in which the global identity key value in the ZID request is recognized as being blank. Upon recognizing the blank value for the global identity key, the game server functions to generate a random string as a new global identity key.

Then, the game server requests a ZID for the new global identity key from the DAPI, as indicated by arrow 3. The DAPI functions to lookup the ZID for the new global identity key in the ZID database. Upon determining that the ZID database does not include a ZID for the new global identity key, the DAPI functions to generate a new ZID for the new global identity key. The DAPI stores the new ZID and new global identity key in the ZID database and returns the new ZID to the game server, as indicated by arrow 4. Then, in accordance with operation 209, the game server transmits the new global identity key and corresponding ZID to the game on the client system 120, as indicated by arrow 5. Upon receiving the new global identity key and corresponding ZID, the game on the client system 120 stores the new global identity key in the game developer's portion of the local store, in accordance with operation 211, as indicated by arrow 6.

It should be understood that in the anonymous play embodiments disclosed herein the ZID is a function of an identity key that is generated on the game server. The identity key is written to the local store of the client system, which is only readable by applications that have access to the seed identifier assigned to the particular application developer. Use of the game server generated identity key as stored in the developer's portion of the local store on the client system is more secure than use of a publicly accessible client system identifier, such as a unique device identifier (UDID). For example, a UDID is available in the settings of the client system and can be read by any application. If an application were to use a publicly accessible client system identifier, such as the UDID, the application would be vulnerable to a malicious developer using the UDID to hijack the application. Therefore, it should be appreciated that use of the game server generated identity key for the client system in conjunction with storage of the identity key in the local store of the client system provides for enhanced security of the application.

Anonymous Play with Second or Later Installation of Application by Developer

Figure 4:
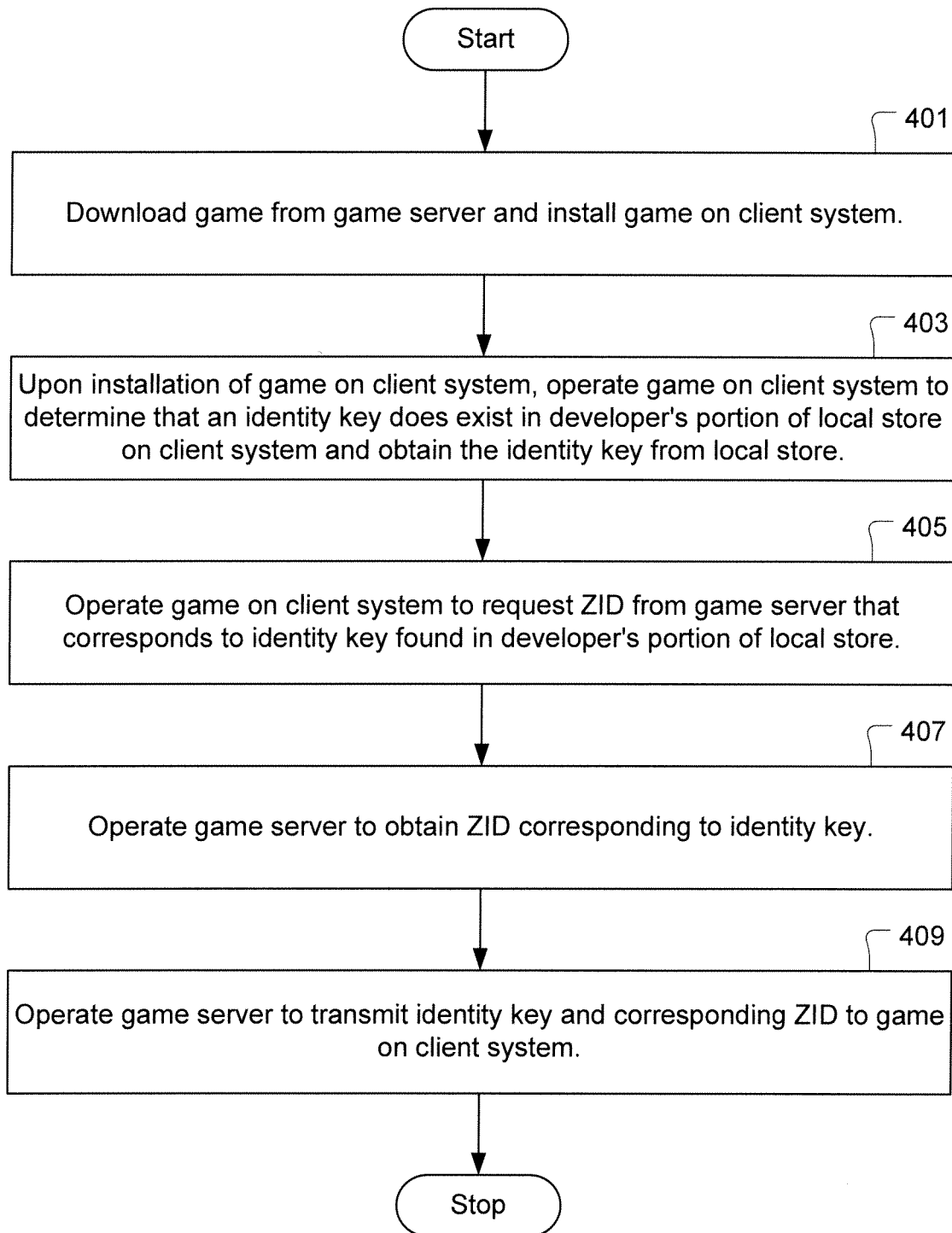
FIG. 4 shows a flowchart of a method for generating a ZID for anonymous play of a given application (AnonZID), when the given application is a second or later installed application by the same developer on the client system, in accordance with one embodiment of the present invention.

FIG. 4 shows a flowchart of a method for generating a ZID for anonymous play of a given application (AnonZID), when the given application is a second or later installed application by the same developer on the client system, in accordance with one embodiment of the present invention. The method includes an operation 401 in which the game is downloaded from its game server and installed on the client system. Upon installation of the game on the client system, the method includes an operation 403 for operating the game on the client system to determine that a global identity key does exist in the game developer's portion of the local store on the client system, and obtain the global identity key from the developer's portion of the local store. It should be understood that in operation 403, the game installed on the client system uses the seed identifier that is assigned to the game's developer by the manufacturer of the client system to access the developer's portion of the local store on the client system.

The method continues with an operation 405 in which the game installed on the client system is operated to request a ZID from the game server that corresponds to the global identity key obtained from the local store of the client system. In an operation 407, the game server receives the ZID request from the game installed on the client system and obtains the ZID corresponding to the global identity key. More specifically, in one embodiment of operation 407, the game server is operated to request the DAPI to return the ZID corresponding to the global identity key included in the ZID request. The DAPI performs a lookup for the global identity key in the ZID database and returns the ZID corresponding to the global identity key to the game server. It should be understood that the global identity key in this instance is associated with the anonymous social network. Therefore, the ZID for the global identity key is a function of the global identity key and the SNID of the anonymous social network, and is referred to as an AnonZID. From operation 407, the method continues with an operation 409 in which the game server transmits the global identity key and the corresponding AnonZID to the game on the client system. The game uses the AnonZID to obtain a saved game state from the game server and make tracking calls.

Figure 5:
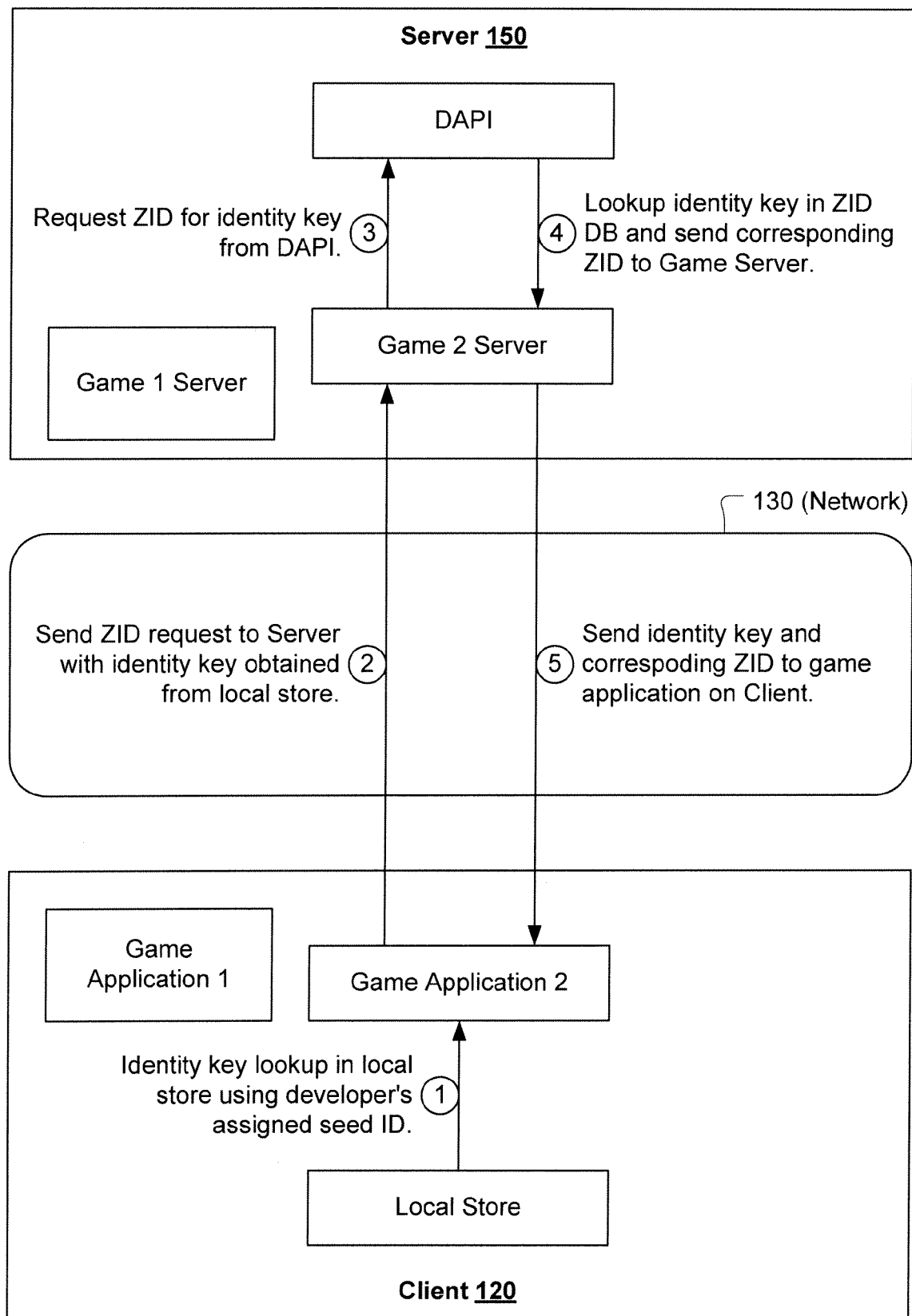
FIG. 5 shows a system flow diagram for the method of FIG. 4, in accordance with one embodiment of the present invention.

FIG. 5 shows a system flow diagram for the method of FIG. 4, in accordance with one embodiment of the present invention. In accordance with operation 403, the new game (Game Application 2) on the client system 120 checks the local store to determine that a global identity key is present in the game developer's portion of the local store, and obtains the global identity key from the local store, as indicated by arrow 1. The new game proceeds with the operation 405 to transmit a ZID request to the corresponding game server (Game 2 Server) on the server system 150, with the global identity key obtained from the local store of the client system 120 included in the ZID request, as indicated by arrow 2.

Upon receiving the ZID request, the game server proceeds with operation 407 in which a request for the ZID corresponding to the global identity key is made to the DAPI, as indicated by arrow 3. The DAPI functions to lookup the ZID for the global identity key in the ZID database and return the ZID to the game server, as indicated by arrow 4. Then, in accordance with operation 409, the game server transmits the global identity key and corresponding ZID to the new game on the client system 120, as indicated by arrow 5. Upon receiving the global identity key and corresponding ZID, the new game can use the ZID, i.e., AnonZID, to obtain a saved game state from the game server and make tracking calls.

In view of the foregoing, it should be understood that multiple games on a given client system can use the same AnonZID corresponding to the global identity key. Each game by the same developer on the client system has access via the assigned seed identifier to the local store of the client system that is assigned to the developer. Therefore, each game by the same developer can obtain the global identity key of the client system from the local store, and can in turn obtain the AnonZID corresponding to the global identity key from the game server.

Two-Layer Identity Key System

Figure 6:
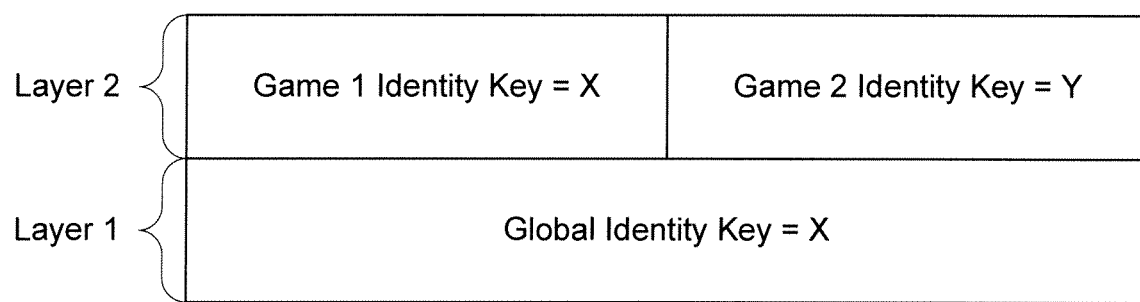
FIG. 6 shows an example diagram of the two-layer identity key system, in accordance with one embodiment of the present invention.

A two-layer identity key system is provided to enable multiple games on a single client system to support different user accounts. FIG. 6 shows an example diagram of the two-layer identity key system, in accordance with one embodiment of the present invention. A first identity key layer (Layer 1) includes the global identity key of the client system. Because the global identity key is generated once for a given developer upon installation of a first application by the given developer on the client system, there is a one-to-one correspondence between the global identity key and the client system. Any application by the given developer will use the global identity key upon its installation on the client system. In the example diagram of FIG. 6, the global identity key for all applications by the given developer on the particular client system is represented as X. The global identity key X is used for first time installation of any applications by the given developer on the particular client system.

A second layer (Layer 2) of the two-layer identity key system is a game specific identity key. In most cases, the game specific identity key is the same as the global identity key. For example, in FIG. 6, Game 1 is installed on the client system and the user is a first time player of Game 1. Therefore, the identity key for Game 1 is the same as the global identity key X.

In one embodiment, the identity key for a game can differ from the global identity key of the client system when multiple users are playing games on the same client system. For example, the identity key for a game can differ from the global identity key of the client system when a second social network connected user is playing the game on the same client system. For instance, with regard to FIG. 6, a Game 2 identity key Y is different from the global identity key X when the player of Game 2 is connected to a social network on the client system.

Also, in one embodiment, the identity key for a game can differ from the global identity key of the client system when a user is playing a game on multiple client systems. For example, the identity key for a game can differ from the global identity key of the client system when a user has loaded their game state from one client system onto another client system. For instance, with regard to FIG. 6, a player has loaded a saved game state for Game 2 from another device such that the Game 2 identity key Y is the same as the global identity key of the other device.

Multiple Client System Synchronization

Figure 7A:
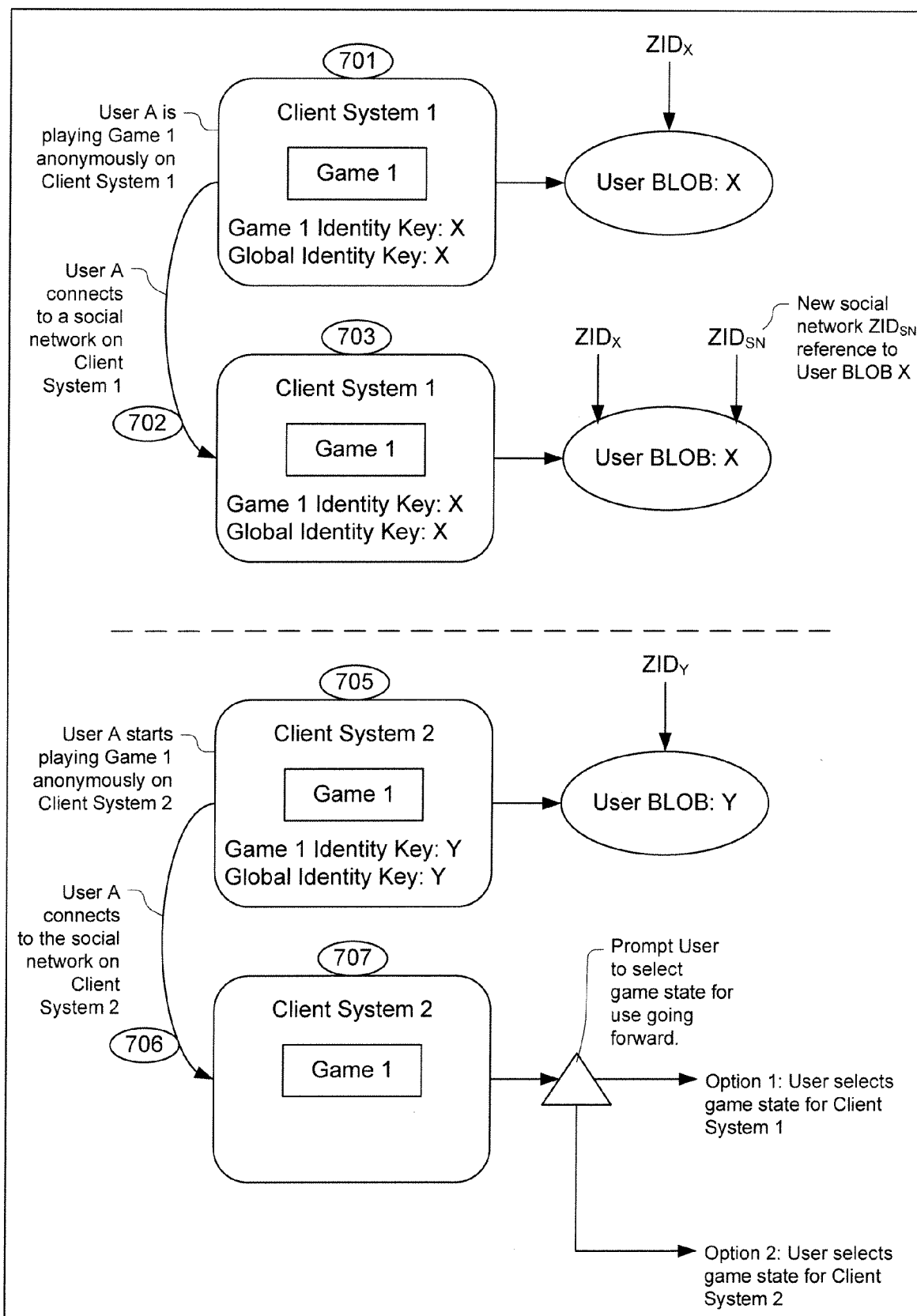
FIG. 7A shows a diagram representing an exemplary implementation of a multiple client system synchronization (sync) process, in accordance with one embodiment of the present invention.

FIG. 7A shows a diagram representing an exemplary implementation of a multiple client system synchronization (sync) process, in accordance with one embodiment of the present invention. The example multiple client system sync process of FIG. 7A is described within the context of two client systems: a Client System 1 and a Client System 2. In one embodiment, the Client System 1 is an IPHONE by APPLE, INC., and the Client System 2 is an IPAD by APPLE, INC. However, it should be understood that in other embodiments, the Client System 1 and the Client System 2 can be essentially any type of client system upon which a game application can be executed. At the top of the diagram, a state 701 is shown in which a User A is playing a Game 1 anonymously on a Client System 1. The global identity key for Client System 1 is X. The identity key for Game 1 on Client System 1 is also X. Therefore, User A is playing Game 1 under $ZID_X$ which corresponds to identity key X and the anonymous social network and which points to User BLOB X. The Game 1 play of User A on Client System 1 is tracked and stored in User BLOB X.

The User A then connects to a social network SN, such as FACEBOOK by way of example, on the Client System 1 which triggers a state transition 702 to a Client System 1 state 703. In state 703, User A continues to play Game 1 on Client System 1 under the social network credentials of User A. Upon connection of User A to the social network, a $ZID_{SN}$ for User A in the social network SN is either created by the DAPI or obtained by the DAPI from the ZID database and is provided to the Client System 1 via the game server. In this instance, the $ZID_{SN}$ for User A in the social network SN is mapped to the User BLOB X. Also, a reference is established from $ZID_{SN}$ to $ZID_X$. Therefore, both the $ZID_X$ for the anonymous play of User A on Client System 1 and the $ZID_{SN}$ for the social network SN connected play of User A on Client System 1 are mapped to the same User BLOB X for User A.

The diagram of FIG. 7A also shows a state 705 in which the User A is playing Game 1 anonymously on a Client System 2. The global identity key for Client System 2 is Y. The identity key for Game 1 on Client System 2 is also Y. Therefore, User A is playing Game 1 under $ZID_Y$ which corresponds to identity key Y and the anonymous social network and which points to User BLOB Y. The Game 1 play of User A on Client System 2 is tracked and stored in User BLOB Y.

Figure 7B:
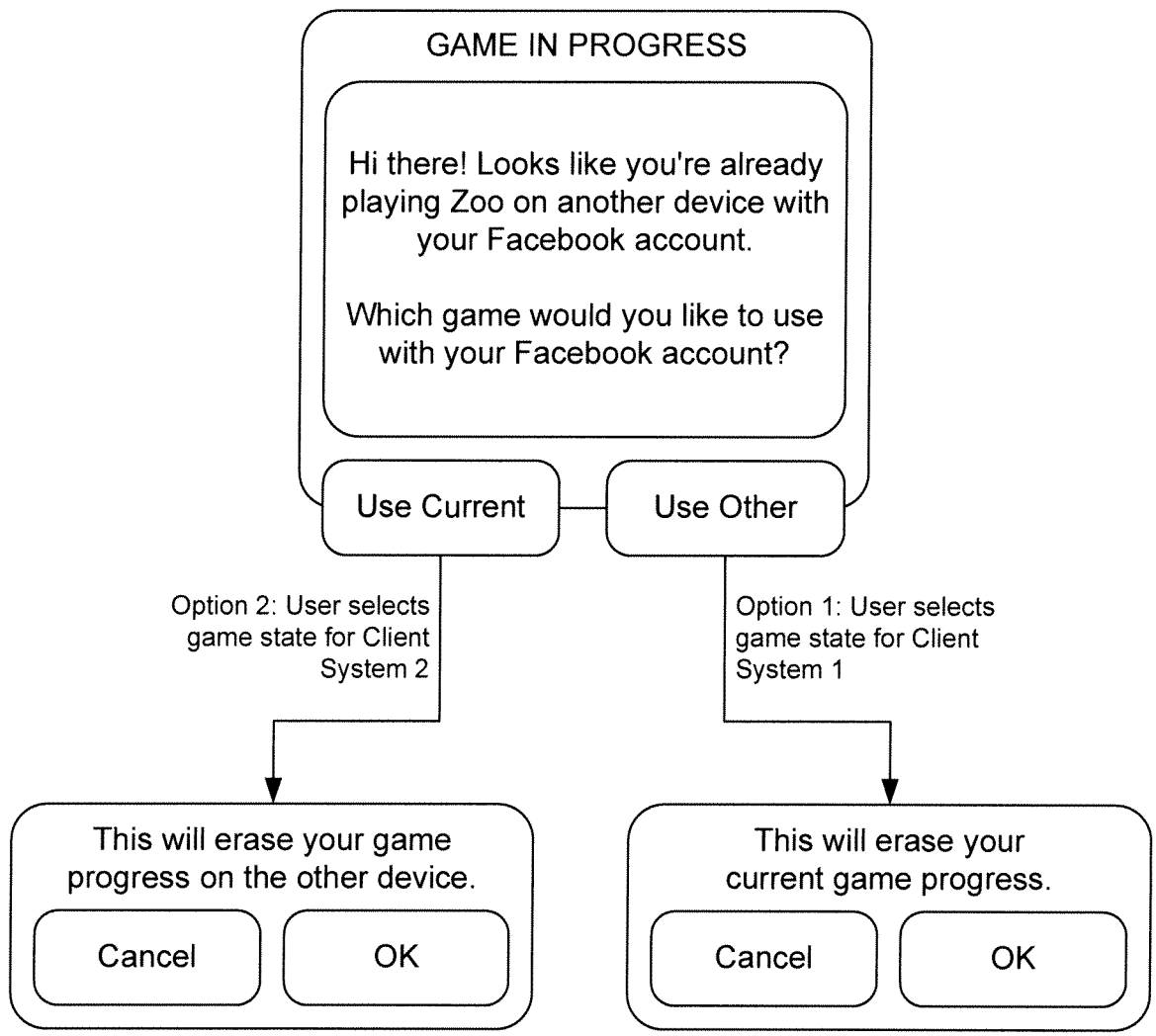
FIG. 7B shows an example dialog that may be presented to User A upon entering state 707, in accordance with one embodiment of the present invention.

The User A then connects to the social network SN on the Client System 2 which triggers a state transition 707 to a Client System 2 state 707. In state 707, the game server obtains the $ZID_{SN}$ for User A through the DAPI and detects that the $ZID_{SN}$ for User A is already mapped to User BLOB X by way of the Game 1 play of User A on Client System 1. Therefore, in state 707, User A is prompted to choose whether the Game 1 play of User A on Client System 2 should be tracked by User BLOB X corresponding to the previous Game 1 play of User A on Client System 1 (Option 1) or by User BLOB Y corresponding to the anonymous play of User A on Client System 2 (Option 2). FIG. 7B shows an example dialog that may be presented to User A upon entering state 707, in accordance with one embodiment of the present invention.

Figure 7C:
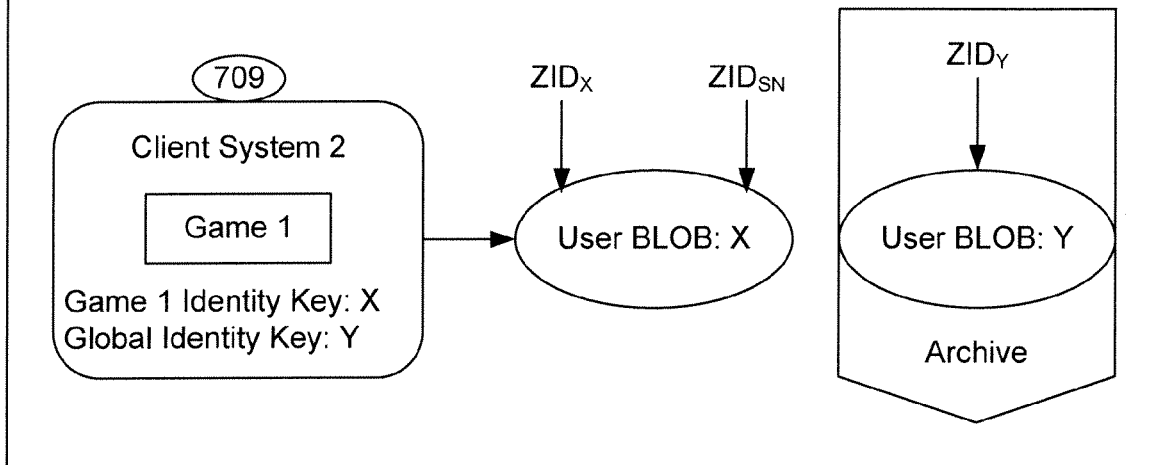
FIG. 7C shows a state 709 of the Client System 2 in the event that User A selects Option 1 to proceed with the game state saved in User BLOB X for the previous Game 1 play by User A on Client System 1, in accordance with one embodiment of the present invention.

FIG. 7C shows a state 709 of the Client System 2 in the event that User A selects Option 1 to proceed with the game state saved in User BLOB X for the previous Game 1 play by User A on Client System 1, in accordance with one embodiment of the present invention. In state 709, the User BLOB Y corresponding to the Game 1 play of User A on Client System 2 is archived on the game server side. The Game 1 identity key on Client System 2 is set to X, which corresponds to the Game 1 play of User A on Client System 1. In following, the $ZID_{SN}$ and $ZID_X$ are mapped to User BLOB X which corresponds to the previous Game 1 play of User A on Client System 1. It should be understood that when User A connects to the social network SN on Client System 2 in state 706, the $ZID_{SN}$ for User A is obtained on the server side and each stored reference from the $ZID_{SN}$ to another ZID, e.g., $ZID_X$, is also obtained. In this manner, it is possible to determine that the User A corresponding to $ZID_{XN}$ has another $ZID_X$ which references a User BLOB X for previous play of Game 1 by User A.

Figure 7D:
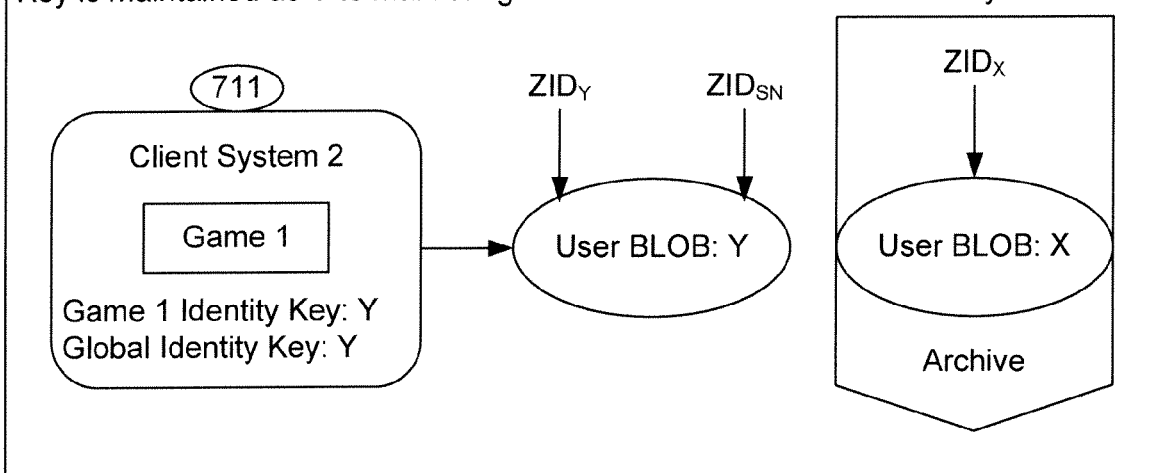
FIG. 7D shows a state 711 of the Client System 2 in the event that User A selects Option 2 to proceed with the present game state in User BLOB Y for Game 1 play by User A on Client System 2, in accordance with one embodiment of the present invention.

FIG. 7D shows a state 711 of the Client System 2 in the event that User A selects Option 2 to proceed with the present game state in User BLOB Y for Game 1 play by User A on Client System 2, in accordance with one embodiment of the present invention. In state 711, the User BLOB X corresponding to the Game 1 play of User A on Client System 1 is archived on the game server side. The Game 1 identity key on Client System 2 is set to Y, which corresponds to the Game 1 play of User A on Client System 2. In following, the $ZID_{SN}$ and $ZID_X$ are mapped to User BLOB Y which corresponds to the Game 1 play of User A on Client System 2. Because User A is connected to the social network in state 711, the identity key associated with $ZID_{SN}$ for User A can be used as the user identifier of game reporting operations. Additionally, in one embodiment, an additional associates table call exists to indicate a mapping from $ZID_Y$ for User A to the identity key associated with $ZID_{SN}$ for User A.

Multiple Social Network Connections on Single Client System

Figure 8A:
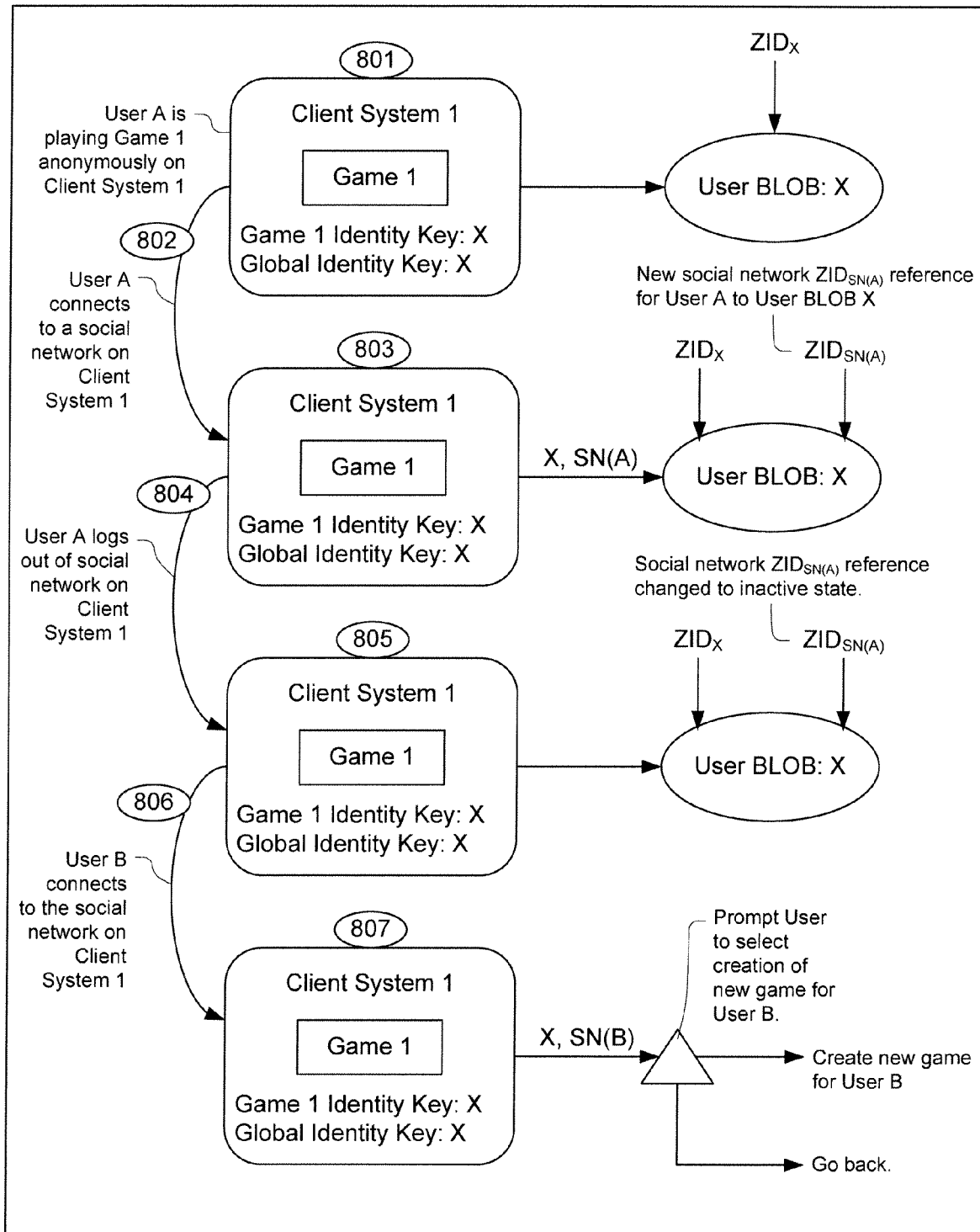
FIG. 8A shows a diagram representing an exemplary implementation of a process for managing multiple social network connections on a single client system, in accordance with one embodiment of the present invention.

FIG. 8A shows a diagram representing an exemplary implementation of a process for managing multiple social network connections on a single client system, in accordance with one embodiment of the present invention. The example process of FIG. 8A is described within the context of two client systems: a Client System 1 and a Client System 2. In one embodiment, the Client System 1 is an IPHONE by APPLE, INC., and the Client System 2 is an IPAD by APPLE, INC. However, it should be understood that in other embodiments, the Client System 1 and the Client System 2 can be essentially any type of client system upon which a game application can be executed. At the top of the diagram, a state 801 is shown in which a User A is playing a Game 1 anonymously on a Client System 1. The global identity key for Client System 1 is X. The identity key for Game 1 on Client System 1 is also X. Therefore, User A is playing Game 1 under $ZID_X$ which corresponds to identity key X and the anonymous social network and which points to User BLOB X. The Game 1 play of User A on Client System 1 is tracked and stored in User BLOB X.

The User A then connects to a social network SN, such as FACEBOOK by way of example, on the Client System 1 which triggers a state transition 802 to a Client System 1 state 803. In state 803, User A continues to play Game 1 on Client System 1 under the social network credentials of User A. Upon connection of User A to the social network, a $ZID_{SN(A)}$ for User A in the social network SN is either created by the DAPI or obtained by the DAPI from the ZID database and is provided to the Client System 1 via the game server. In this instance, the $ZID_{SN(A)}$ for User A in the social network SN is mapped to the User BLOB X. Also, a reference is established from $ZID_{SN(A)}$ to $ZID_X$. Therefore, both the $ZID_X$ for the anonymous play of User A on Client System 1 and the ZIDsN(A) for the social network SN connected play of User A on Client System 1 are mapped to the same User BLOB X for User A.

The User A then logs out of the social network SN on the Client System 1 which triggers a state transition 804 to a Client System 1 state 805. In state 805, Game 1 on Client System 1 continues to be associated with User BLOB X by way of $ZID_X$. Also, in state 805, the $ZID_{SN(A)}$ is changed to an inactive state. It should be understood that in this embodiment, the game server maintains a record of the $ZID_{SN(A)}$ for User A having been connected to User BLOB X, even after User A has logged out of the social network SN.

A new User B then connects to the social network SN on the Client System 1 which triggers a state transition 806 to a Client System 1 state 807. In state 807, a ZID request for the social network SN identity of User B is transmitted from the game on Client System 1 to the game server. At this point, the game server detects that there are two different SN accounts trying to access the same User BLOB X. Because User B is a new player, there is no User BLOB associated with the social network SN account of User B. At this point, the game server prompts the User B to select whether or not a new Game 1 is to be created for User B.

Figure 8B:
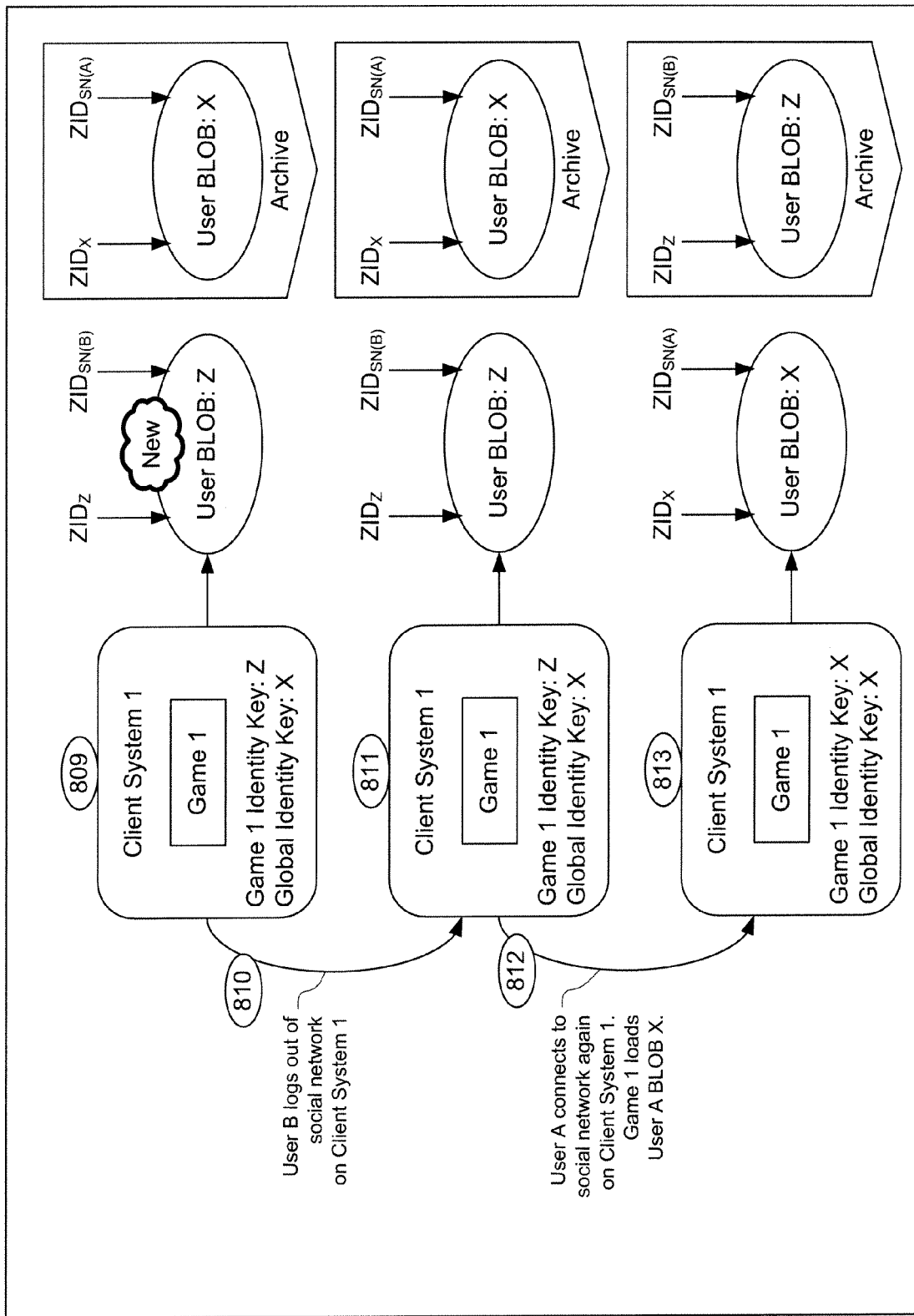
FIG. 8B shows a diagram representing continuation of the exemplary implementation of the process for managing multiple social network connections on the single client system as shown in FIG. 8A, in the event that User B is a first time player of Game 1, in accordance with one embodiment of the present invention.

FIG. 8B shows a diagram representing continuation of the exemplary implementation of the process for managing multiple social network connections on the single client system as shown in FIG. 8A, in the event that User B is a first time player of Game 1, in accordance with one embodiment of the present invention. FIG. 8B shows a state 809 in which the User B is logged in to their social network SN account on Client System 1. Upon initiation of play of Game 1 on Client System 1 by User B under their social network SN connection, a request for the saved Game 1 state for User B is transmitted from Client System 1 to the game server. In processing this request, the game server does not find an existing User BLOB for User B because User B is a first time player of Game 1. In response to not finding the User BLOB for User B, the game server generates a new identity key Z for User B and obtains a corresponding $ZID_Z$ through the DAPI. The game server also creates a new User BLOB Z to maintain the Game 1 state of User B.

The new identity key Z and corresponding $ZID_Z$ is transmitted from the game server to the Client System 1. The Client System 1 then stores the new identity key Z in a Game 1 identity key field of the local store on the Client System 1. The Game 1 play of User B on Client System 1 is then tracked and maintained within User BLOB Z. Both $ZID_S$ corresponding to the anonymous play of User B on Client System 1 and $ZID_{SN(B)}$ corresponding to the social network SN connected play of User B on Client System 1 are mapped to User BLOB Z. Also, the previous User BLOB X corresponding to the anonymous play of User A on Client System 1 is archived.

The User B then logs out of the social network SN on the Client System 1 which triggers a state transition 810 to a Client System 1 state 811. In state 811, Game 1 on Client System 1 continues to be associated with User BLOB Z by way of $ZID_Z$. Also, in state 811, the $ZID_{SN(B)}$ is changed to an inactive state. However, the game server maintains a record of the $ZID_{SN(B)}$ for User B having been connected to User BLOB Z, even after User B has logged out of the social network SN. Thus, the User B can logout of the social network SN and continue to play Game 1 anonymously on Client System 1 through reference to the User BLOB Z.

The User A then reassumes control of the Client System 1 and connects to the social network SN on the Client System 1 which triggers a state transition 812 to a Client System 1 state 813. In state 813, once the User A connects to the social network SN, the Game 1 identity key in the local store is overwritten with the identity key X associated with both User A and Client System 1. Upon connection of User A to the social network, the $ZID_{SN(A)}$ for User A in the social network SN is obtained by the DAPI from the ZID database and is provided to the Client System 1 via the game server. In this instance, the $ZID_{SN(A)}$ for User A in the social network SN is mapped to the User BLOB X. Also, a reference is established from $ZID_{SN(A)}$ to $ZID_X$. Therefore, both the $ZID_X$ for the anonymous play of User A on Client System 1 and the $ZID_{SN(A)}$ for the social network SN connected play of User A on Client System 1 are mapped to the same User BLOB X for User A. Also, the previous User BLOB Z corresponding to the play of User B on Client System 1 is archived.

Figure 8C:
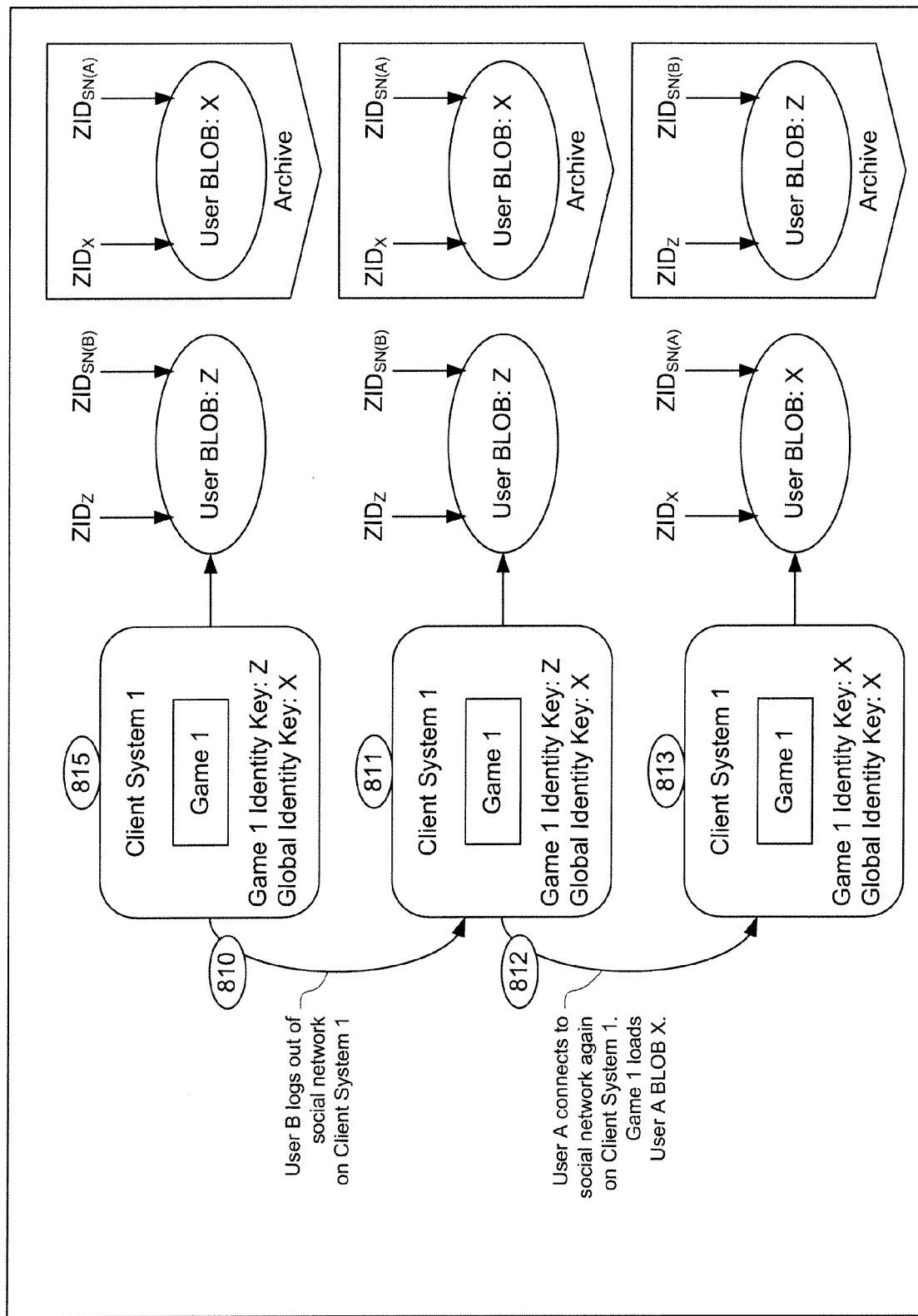
FIG. 8C shows a diagram representing continuation of the exemplary implementation of the process for managing multiple social network connections on the single client system as shown in FIG. 8A, in the event that User B is a previous player of Game 1, in accordance with one embodiment of the present invention.

FIG. 8C shows a diagram representing continuation of the exemplary implementation of the process for managing multiple social network connections on the single client system as shown in FIG. 8A, in the event that User B is a previous player of Game 1, in accordance with one embodiment of the present invention. In this case, based on User B's social network SN credentials, the game server detects that User B is an existing player and loads the User BLOB Z corresponding to User B. Specifically, FIG. 8C shows a state 815 in which the User B is logged in to their social network SN account on Client System 1. Upon initiation of play of Game 1 on Client System 1 by User B under their social network SN connection, a request for the saved Game 1 state for User B is transmitted from Client System 1 to the game server. In processing this request, the game server does find an existing User BLOB Z for User B.

The identity key Z and corresponding $ZID_Z$ is transmitted from the game server to the Client System 1. The Client System 1 then stores the identity key Z in the Game 1 identity key field of the local store on the Client System 1. The Game 1 play of User B on Client System 1 is then tracked and maintained within User BLOB Z. Both $ZID_Z$ corresponding to the anonymous play of User B on Client System 1 and $ZID_{SN(B)}$ corresponding to the social network SN connected play of User B on Client System 1 are mapped to User BLOB Z. Also, the previous User BLOB X corresponding to the anonymous play of User A on Client System 1 is archived. Then, states 811, 812, and 813 in FIG. 8C proceed as described above with regard to FIG. 8B.

Game State Recovery

In the event that a user's application becomes non-functional, the user may contact the application developer's customer support service to recover a previously saved application state. In this case, the customer support service will need an identifier in order to retrieve the user's information and saved application state. Because the user's ZID is based on an identity key written to the local store of the user's client system, which is not accessible by the user, the customer support service will require another identifier in order to retrieve the user's information and saved application state.

In one embodiment, a unique device identifier (UDID) of the client system can be used by the customer support service to retrieve the user's saved User BLOB. In this embodiment, the User BLOB should store an array of UDIDs associated with the User BLOB. Also, an administration tool is provided to the customer support service to enable retrieval of the user's account information and User BLOB.

In another embodiment, an email-based solution is implemented to enable retrieval of the user's information and saved application state. In this embodiment, the user is prompted to enter their email address to save their game state in case of problems. In one embodiment, this user prompt may be displayed after the user has progressed through a few levels of the application. Also, in one embodiment, an option to add an email address is provided in a settings menu of the application. In one embodiment, when a user specifies an email address, a verification email is transmitted to the user's email address to confirm that the user's email address is correct. Upon verification that the user's email address is correct, the user's email address can be used as another key to retrieve the user's account information and User BLOB.

Integrated Identity Key Management System

FIGS. 9A-9D show flowcharts of a method for integrated identity key management, in accordance with one embodiment of the present invention. The method begins in FIG. 9A with an operation 901 for determining whether or not a user on a client system is connected to, i.e., logged in to, a social network on the client system. If the user is not logged into a social network, the method proceeds with an operation 903 for determining whether or not a global identity key is present in a local store of the client system. If the global identity key is present in the local store of the client system, the method proceeds with an operation 907 in which a ZID request is transmitted form the client system to a game server. In the operation 907, the ZID request includes the global identity key from the local store of the client system and does not include a social network identity for the user.

If operation 903 determines that the global identity key is not present in the local store of the client system, the method proceeds with an operation 905 in which a ZID request is transmitted from the client system to a game server. However, in the operation 905, the ZID request includes a blank value for the global identity key and does not include a social network identity for the user. From each of operations 905 and 907, the method proceeds with an operation 919 is FIG. 9B.

Figure 9A:
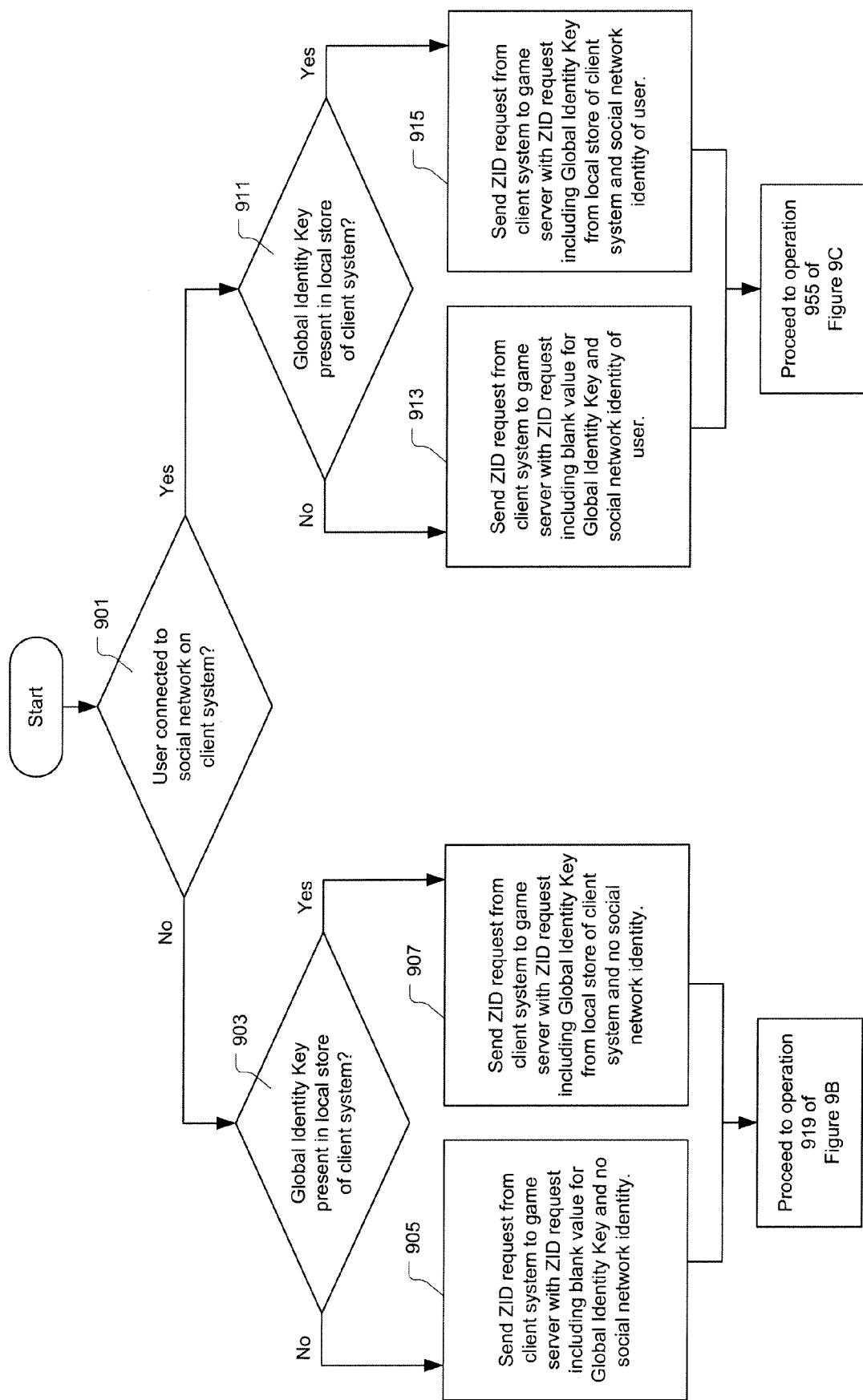
FIGS. 9A-9D show flowcharts of a method for integrated identity key management, in accordance with one embodiment of the present invention.
Figure 9B:
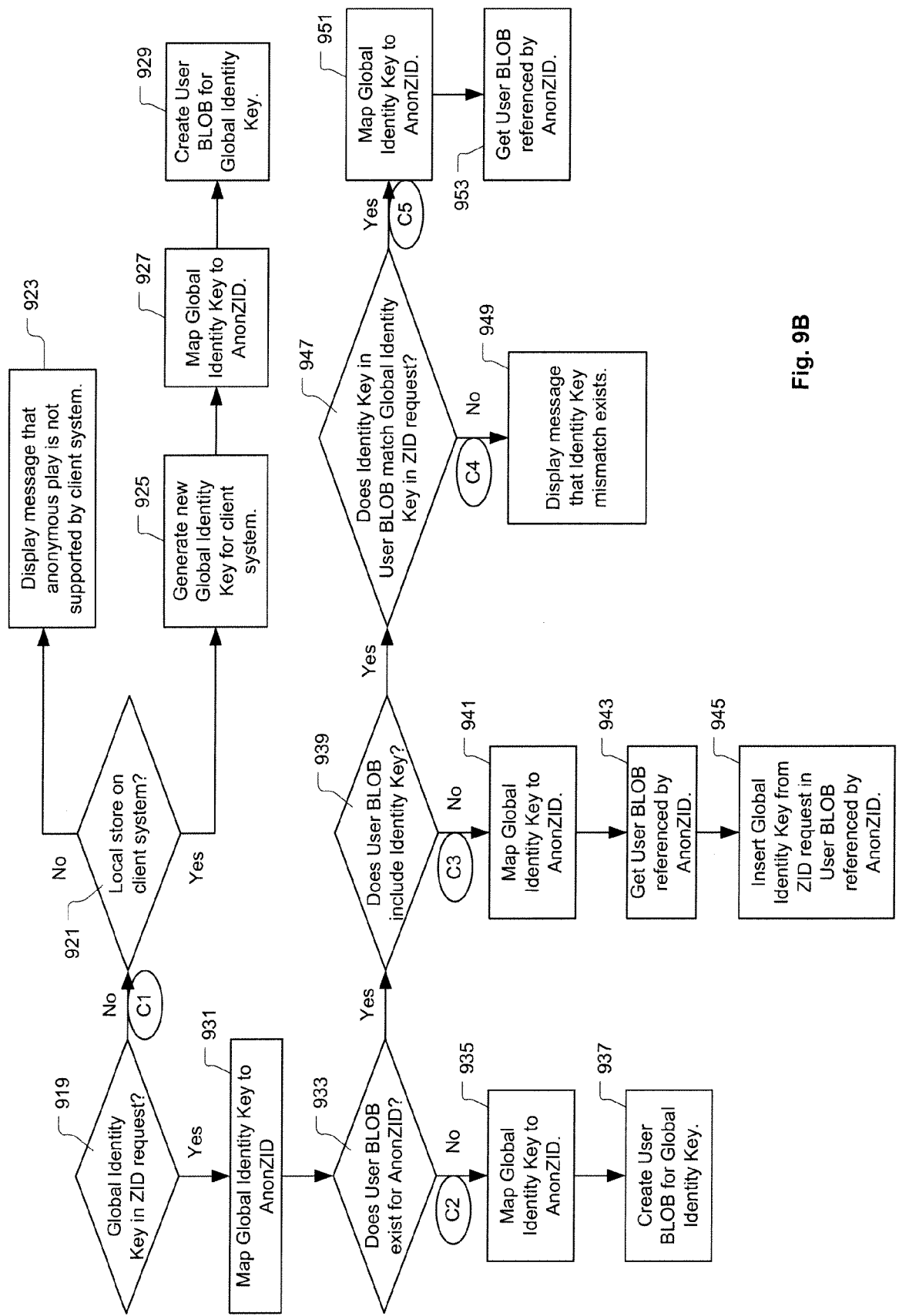
Figure 9C:
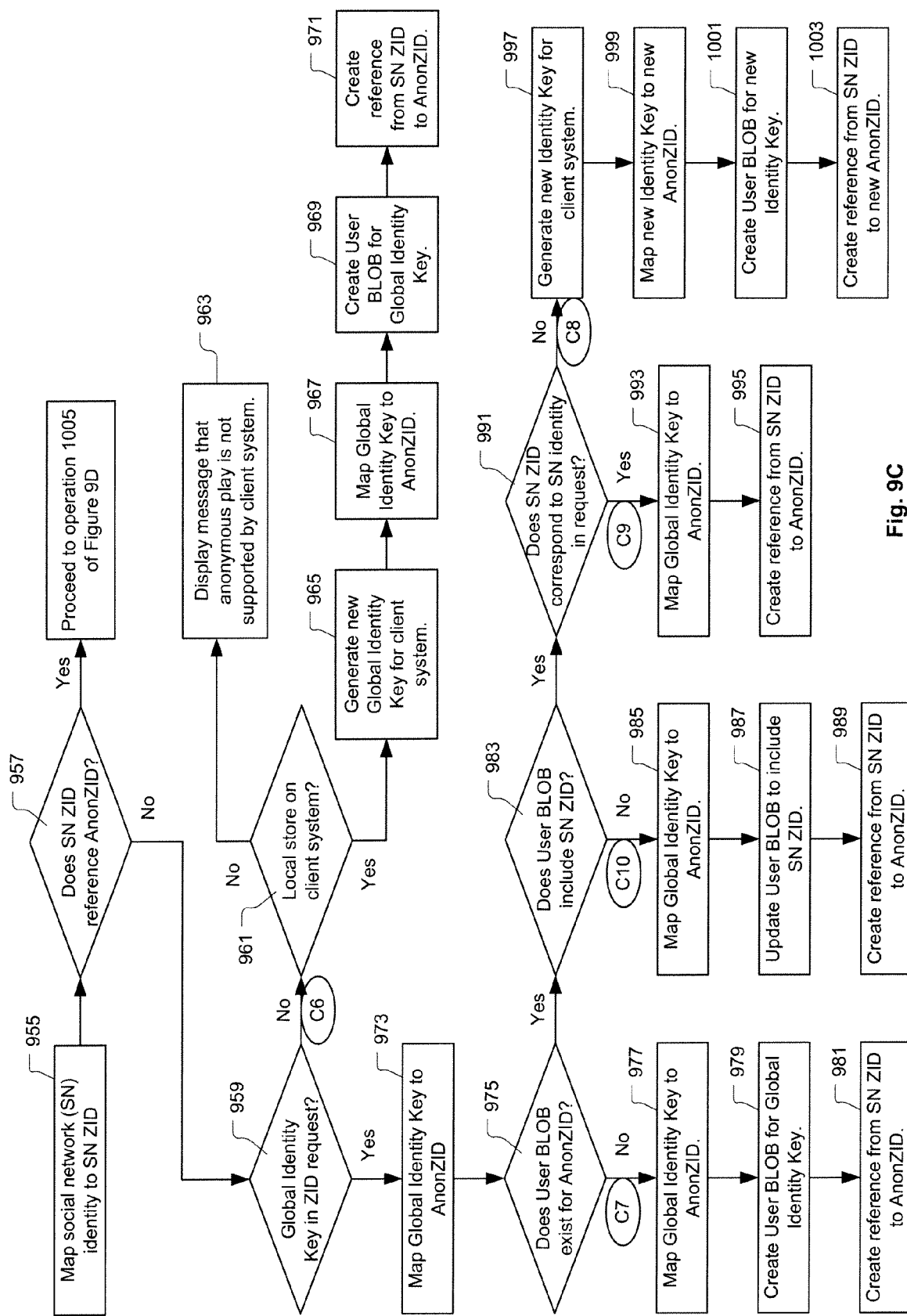

In operation 919 of FIG. 9B, a determination is made as to whether or not the global identity key is present in the ZID request received at the game server from the client system. If a non-blank value is present for the global identity key, it is determined that the global identity key does exist. If a blank value is present for the global identity key, it is determined that the global identity key does not exist. If the global identity key does not exist in the ZID request, a condition C1 exists and the method proceeds with an operation 921. The condition C1 corresponds to a user installing a first application by the developer on the client system in an anonymous play mode. In the operation 921, a determination is made as to whether or not a local store exists on the client system. If a local store does not exist on the client system, the method proceeds with an operation 923 to display a message to the user on the client system that anonymous play is not supported by the client system, because there is no local store available to store the global identity key for the client system.

If operation 921 determines that a local store does exist on the client system, the method proceeds with an operation 925 to generate a new global identity key for the client system. In one embodiment, generation of the new global identity key is done in the same manner as previously described with regard to FIG. 2. From the operation 925, the method proceeds with an operation 927 in which the global identity key is mapped to a new AnonZID. Then, in an operation 929, a User BLOB is created for the global identity key.

With reference back to operation 919, if it is determined that the global identity key is present in the ZID request, the method proceeds with an operation 931 to map the global identity key to its corresponding AnonZID. Then, an operation 933 is performed to determine whether or not a User BLOB exists for the AnonZID to which the global identity key is mapped. If operation 933 determines that the User BLOB for the AnonZID does not exist, a condition C2 exists and the method proceeds with an operation 935. The condition C2 corresponds to a user installing a second or later application by the developer on the client system in the anonymous play mode. The operation 935 includes mapping the global identity key to its corresponding AnonZID. An operation 937 is then performed to create a User BLOB for the global identity key and the newly installed application.

With reference back to operation 933, if it is determined that the User BLOB for the AnonZID does exist, the method proceeds with an operation 939 to determine whether or not the User BLOB includes an identity key. If it is determined that the User BLOB for the AnonZID does not include an identity key, a condition C3 exists and the method proceeds with an operation 941. The condition C3 corresponds to an error condition in which it is recognized by the game server that the User BLOB is missing an identity key that should be present. In the operation 941, the global identity key is mapped to its corresponding AnonZID. Then, an operation 943 is performed to obtain the User BLOB referenced by the AnonZID that is mapped to the global identity key. Then, in an operation 945, the global identity key from the AnonZID request is inserted, i.e., stored, in the User BLOB referenced by the AnonZID that is mapped to the global identity key. It should be understood the operations 941 through 945 resolve the condition C3.

With reference back to operation 939, if it is determined that the User BLOB for the AnonZID does include an identity key, the method proceeds with an operation 947 to determine whether or not the identity key in the User BLOB matches the global identity key in the ZID request. If operation 947 determines that the identity key in the User BLOB does not match the global identity key in the ZID request, a condition C4 exists and the method proceeds with an operation 949. The condition C4 corresponds to an error condition in which it is recognized by the game server that an identity key mismatch exists between the User BLOB for the AnonZID and the global identity key in the ZID request that was mapped to the AnonZID. In the operation 949, a message is displayed to the user on the client system that the identity key mismatch has occurred.

With reference back to operation 947, if it is determined that the identity key in the User BLOB does match the global identity key in the ZID request, a condition C5 exists and the method proceeds with an operation 951. The condition C5 corresponds to a properly completed authentication for anonymous play mode on the client system. In the operation 951, the global identity key is mapped to its corresponding AnonZID. Then, an operation 953 is performed to obtain the User BLOB referenced by the AnonZID that is mapped to the global identity key.

With reference back to operation 901 of FIG. 9A, if the user is connected to, i.e., logged in to, a social network on the client system, the method proceeds with an operation 911 for determining whether or not a global identity key is present in a local store of the client system. If the global identity key is present in the local store of the client system, the method proceeds with an operation 915 in which a ZID request is transmitted from the client system to a game server. In the operation 915, the ZID request includes the global identity key from the local store of the client system and includes the social network identity for the user.

If operation 911 determines that the global identity key is not present in the local store of the client system, the method proceeds with an operation 913 in which a ZID request is transmitted from the client system to a game server. However, in the operation 913, the ZID request includes a blank value for the global identity key, but does include the social network identity for the user. From each of operations 913 and 915, the method proceeds with an operation 955 is FIG. 9C.

In operation 955, the social network identity for the user as included in the ZID request is mapped to a social network ZID on the game server. The method then proceeds with an operation 957 for determining whether or not the social network ZID references an AnonZID. If operation 957 determines that the social network ZID does not reference an AnonZID, the method proceeds with an operation 959 for determining whether or not a global identity key is present in the ZID request. If a non-blank value is present for the global identity key, it is determined in operation 959 that the global identity key does exist. If a blank value is present for the global identity key, it is determined in operation 959 that the global identity key does not exist. If the global identity key does not exist in the ZID request, a condition C6 exists and the method proceeds with an operation 961. The condition C6 corresponds to a user installing a first application by the developer on the client system in a social network connected play mode. In the operation 961, a determination is made as to whether or not a local store exists on the client system. If a local store does not exist on the client system, the method proceed with an operation 963 to display a message to the user on the client system that anonymous play is not supported by the client system, because there is no local store available to store the global identity key for the client system.

If operation 961 determines that a local store does exist on the client system, the method proceeds with an operation 965 to generate a new global identity key for the client system. In one embodiment, generation of the new global identity key is done in the same manner as previously described with regard to FIG. 2. From the operation 965, the method proceeds with an operation 967 in which the global identity key is mapped to a new AnonZID. Then, in an operation 969, a User BLOB is created for the global identity key. The method also includes an operation 971 for creating a reference from the social network ZID to the AnonZID.

With reference back to operation 959, if it is determined that the global identity key is present in the ZID request, the method proceeds with an operation 973 to map the global identity key to its corresponding AnonZID. Then, an operation 975 is performed to determine whether or not a User BLOB exists for the AnonZID to which the global identity key is mapped. If operation 975 determines that the User BLOB for the AnonZID does not exist, a condition C7 exists and the method proceeds with an operation 977. The condition C7 corresponds to a user installing a second or later application by the developer on the client system in the social network connected play mode. The operation 977 includes mapping the global identity key to its corresponding AnonZID. An operation 979 is then performed to create a User BLOB for the global identity key and the newly installed application. An operation 981 is also performed to create a reference from the social network ZID to the AnonZID.

With reference back to operation 975, if it is determined that the User BLOB for the AnonZID does exist, the method proceeds with an operation 983 to determine whether or not the User BLOB for the AnonZID includes a social network ZID. If operation 983 determines that the User BLOB for the AnonZID does not include a social network ZID, a condition C10 exists and the method proceeds with an operation 985. The condition C10 corresponds to the user on the client system connecting to the social network for the first time to enter the social network connected play mode of the game. The operation 985 includes mapping the global identity key to its corresponding AnonZID. An operation 987 is then performed to update the User BLOB for the AnonZID to include the social network ZID to which the social network identity of the user is mapped in operation 955. An operation 989 is also performed to create a reference from the social network ZID to the AnonZID.

With reference back to operation 983, if it is determined that the User BLOB for the AnonZID does include a social network ZID, the method proceeds with an operation 991 to determine whether or not the social network ZID in the User BLOB corresponds to the social network identity included in the ZID request. If operation 991 determines that the social network ZID in the User BLOB does correspond to the social network identity included in the ZID request, a condition C9 exists and the method proceeds with an operation 993. The condition C9 corresponds to an error condition in which the social network ZID does not reference an AnonZID, although it should. The operation 993 includes mapping the global identity key to its corresponding AnonZID. An operation 995 is also performed to create a reference from the social network ZID to the AnonZID, thereby resolving condition C9.

With reference back to operation 991, if it is determined that the social network ZID in the User BLOB does not correspond to the social network identity included in the ZID request, a condition C8 exists and the method proceeds with an operation 997. The condition C8 corresponds to a new user on an existing client system connecting to the social network to enter the social network connected play mode of the game. In the operation 997, a new identity key is generated for the new user on the existing client system. In one embodiment, generation of the new identity key is done in the same manner as previously described with regard to FIG. 2. From the operation 997, the method proceeds with an operation 999 in which the new identity key is mapped to a new AnonZID. Then, in an operation 1001, a User BLOB is created for the new identity key. The method also includes an operation 1003 for creating a reference from the social network ZID (as mapped to in operation 955) to the new AnonZID.

Figure 9D:
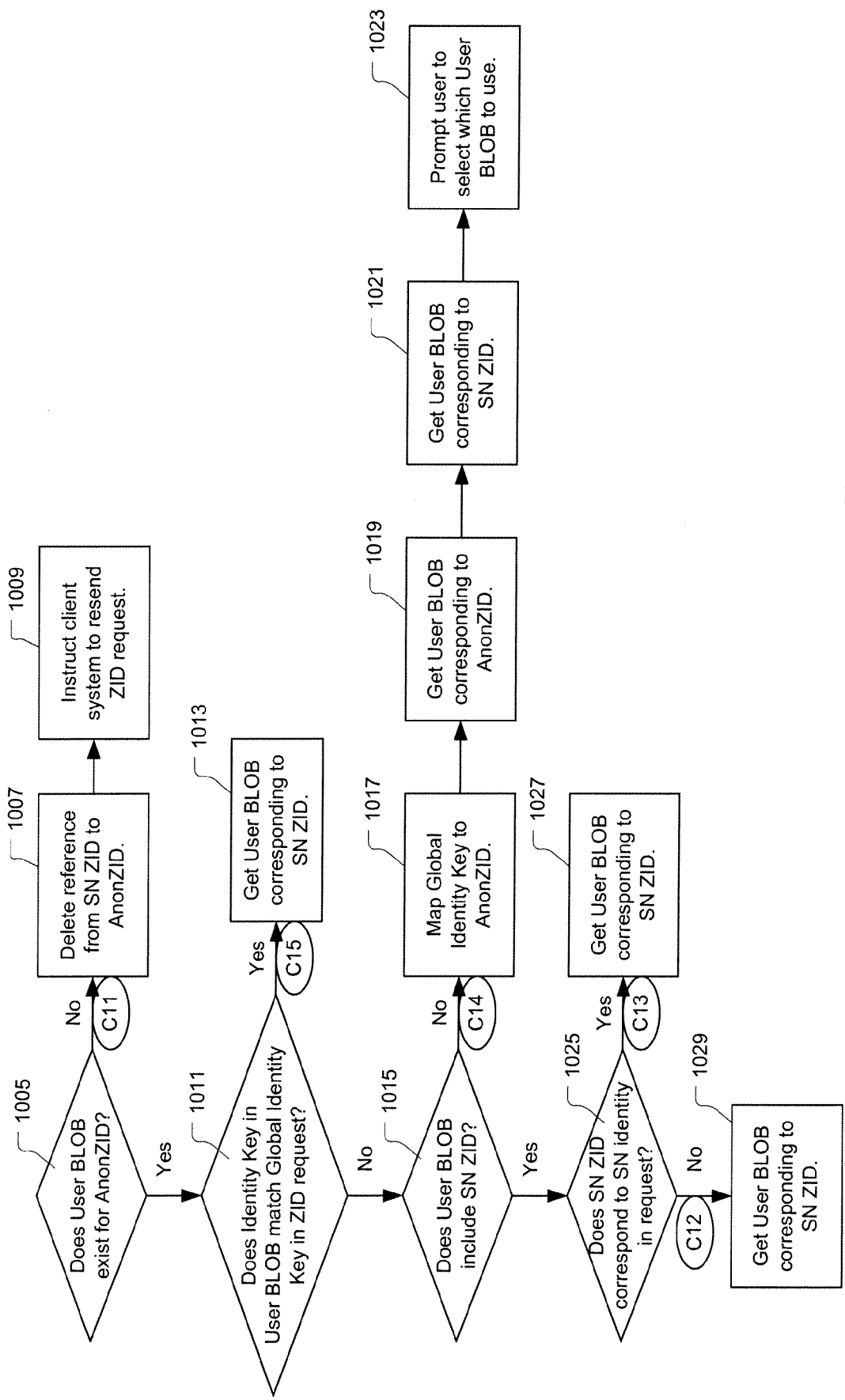

With reference back to operation 957, if it is determined that the social network ZID (as mapped to in operation 955) does not reference an AnonZID, the method proceeds with an operation 1005 in FIG. 9D. In operation 1005, a determination is made as to whether or not a User BLOB exists for the AnonZID to which the global identity key is mapped. If operation 1005 determines that the User BLOB for the AnonZID does not exist, a condition C11 exists and the method proceeds with an operation 1007. The condition C11 corresponds to an error condition in which the User BLOB for the AnonZID is missing, but should exist. The operation 1007 includes deleting the reference from the social network ZID to the AnonZID. Then, in an operation 1009, the client system is instructed to resend the ZID request, such that appropriate operation of the present method can be performed to create the missing User BLOB of the AnonZID.

With reference back to operation 1005, if it is determined that the User BLOB for the AnonZID does exist, the method proceeds with an operation 1011 to determine whether or not the identity key in the User BLOB matches the global identity key in the ZID request. If operation 1011 determines that the identity key in the User BLOB does match the global identity key in the ZID request, a condition C15 exists and the method proceeds with an operation 1013. The condition C15 corresponds to a properly completed authentication for social network connected play mode on the client system. In the operation 1013, the User BLOB referenced by the social network ZID is obtained to track the game play on the client system.

With reference back to operation 1011, if it is determined that the identity key in the User BLOB does not match the global identity key in the ZID request, the method proceeds with an operation 1015 to determine whether or not the User BLOB for the AnonZID includes a social network ZID. If operation 1015 determines that the User BLOB for the AnonZID does not include a social network ZID, a condition C14 exists and the method proceeds with an operation 1017. The condition C14 corresponds to a condition in which the user on the client system has multiple saved game states available. The operation 1017 includes mapping the global identity key to its corresponding AnonZID. An operation 1019 is then performed to obtain the User BLOB for the AnonZID to which the global identity key maps. An operation 1021 is also performed to obtain the User BLOB corresponding to the social network ZID to which the social network identity of the user is mapped in operation 955. An operation 1023 is then performed to prompt the user on the client system to select which saved game state, is to be used going forward, i.e., either the game state stored in the User BLOB for the AnonZID or the game state stored in the User BLOB for the social network ZID.

With reference back to operation 1015, if it is determined that the User BLOB for the AnonZID does include a social network ZID, the method proceeds with an operation 1025 to determine whether or not the social network ZID in the User BLOB corresponds to the social network identity included in the ZID request. If operation 1025 determines that the social network ZID in the User BLOB does correspond to the social network identity included in the ZID request, a condition C13 exists and the method proceeds with an operation 1027. The condition C13 corresponds to a known social network connected user playing on a second client system. The operation 1027 includes obtaining the User BLOB referenced by the social network ZID and using this User BLOB to track the game play on the client system.

With reference back to operation 1025, if it is determined that the social network ZID in the User BLOB does not correspond to the social network identity included in the ZID request, a condition C12 exists and the method proceeds with an operation 1029. The condition C12 corresponds to a guest user on an existing client system connecting to the social network to enter the social network connected play mode of the game. The operation 1029 includes obtaining the User BLOB referenced by the social network ZID and using this User BLOB to track the game play on the client system.

It should be understood that the methods for anonymous play as disclosed herein support restoration of a game state following deletion of the corresponding game application from the client system and reinstallation of the corresponding game application on the client system. This is because the local store of the client system remains unaffected when the game application is deleted from the client system. In one embodiment, the local store of the client system is only cleaned, i.e., erased, when the client system is subjected to a master reset process. If a master reset is performed on the client system, a new user of the client system can start a new game on the client system under a new global identity key.

Additionally, in view of the foregoing, it should be understood that the method for integrated identity key management disclosed herein provides for seamless transition between anonymous play mode and social network connected play mode in both directions. As discussed above, if a user is playing a game on a client system in anonymous play mode and then connects to a social network, a new social network ZID is created that points to the same User BLOB that was tracking the user's game play in the anonymous play mode. Also, if the user connects to multiple social networks, a new social network ZID is created for each of the multiple social networks, and each new social network ZID is made to reference the same User BLOB that also corresponds to the user's game play in the anonymous play mode on their client system.

When the user disconnects from a social network, the reference to the User BLOB from the social network ZID for the disconnected social network is changed to an inactive state. It should be appreciated that because each social network ZID for a given user resolves down to the same User BLOB for the given user, a saved game state that is stored in the User BLOB can be retrieved through any of the social network identifiers for the given user. Thus, a user's game state can be maintained when the user plays on multiple client systems provided that the user connects to a social network on each client system. Also, in the method for integrated identity key management disclosed herein, cross-game reporting is enabled because each game shares the same AnonZID.

Exemplary Computing Network for Anonymous Play Embodiments

Figure 10:
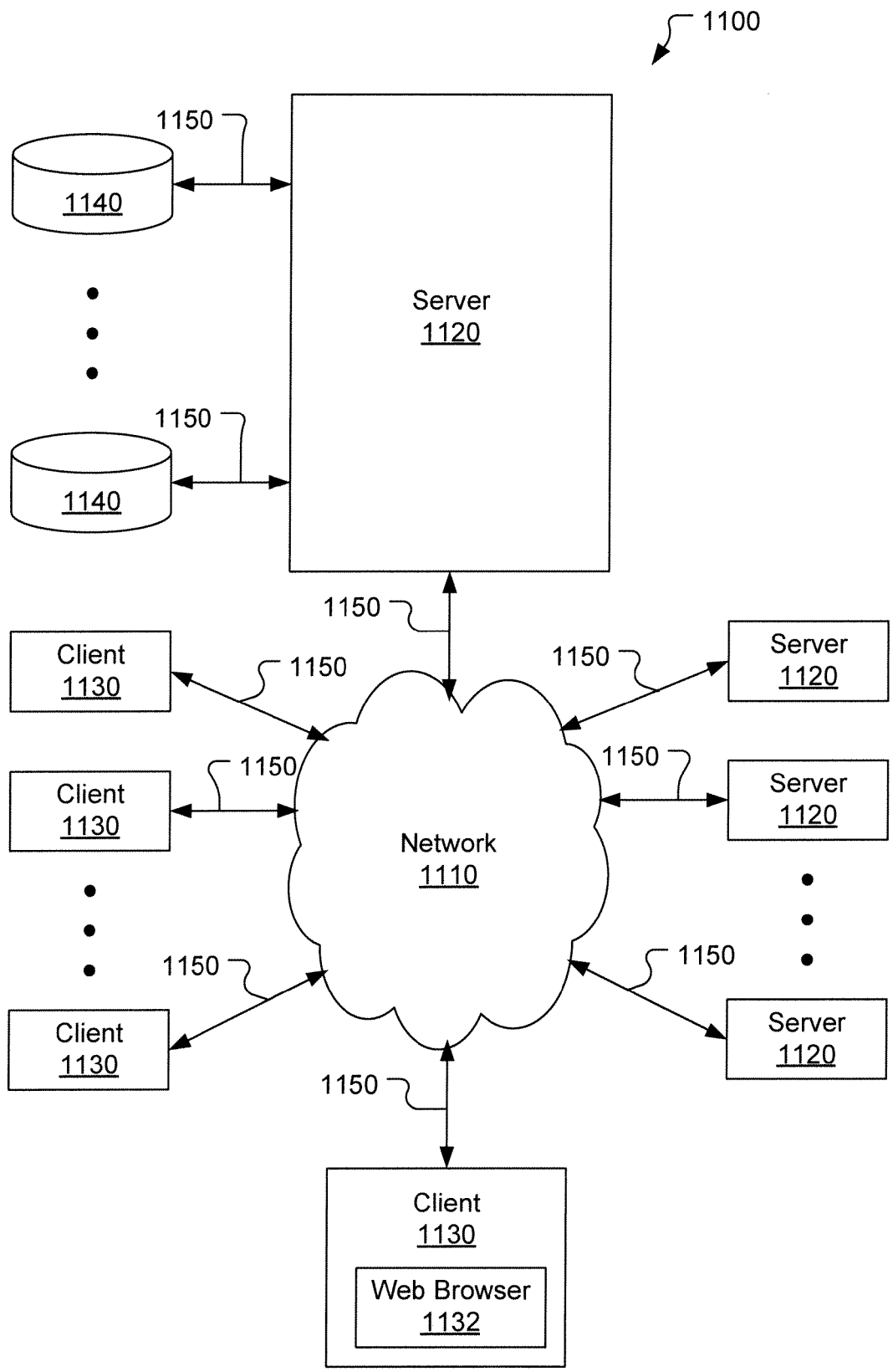
FIG. 10 shows an example of such a network environment, in accordance with one embodiment of the present invention.

Anonymous play embodiments disclosed herein may be implemented in a network environment. FIG. 10 shows an example of such a network environment 1100, in accordance with one embodiment of the present invention. The network environment 1100 includes a network 1110 coupling one or more servers 1120 and one or more clients 1130 to each other. In various embodiments, network 1110 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 1110. The present disclosure contemplates any suitable network 1110.

One or more links 1150 couple a server 1120 or a client 1130 to network 1110. In various embodiments, each of the one or more links 1150 include one or more wireline, wireless, or optical links. In various embodiments, each of the one or more links 1150 include an intranet, an extranet, a VPN, a LAN, a WLAN, a WAN, a MAN, a portion of the Internet, or another link 1150 or a combination of two or more such links 1150. The present disclosure contemplates any suitable links 1150 coupling servers 1120 and clients 1130 to network 1110.

In various embodiments, each server 1120 may be a unitary server or may be a distributed server spanning multiple computers or multiple datacenters. Servers 1120 may be of various types, such as, for example and without limitation, web server, news server, mail server, message server, advertising server, file server, application server, exchange server, database server, or proxy server. In various embodiments, each server 1120 may include hardware, software, or embedded logic components or a combination of two or more such components for carrying out the appropriate functionalities implemented or supported by server 1120. For example, a web server is generally capable of hosting websites containing web pages or particular elements of web pages. More specifically, a web server may host HTML files or other file types, or may dynamically create or constitute files upon a request, and communicate those files to clients 1130 in response to HTTP or other requests from clients 1130. A mail server is generally capable of providing electronic mail services to various clients 1130. A database server is generally capable of providing an interface for managing data stored in one or more data stores.

In various embodiments, one or more data storage devices 1140 may be communicatively linked to one or more servers 1120 via one or more links 1150. In various embodiments, data storage devices 1140 may be used to store various types of information. In various embodiments, the information stored in data storage devices 1140 may be organized according to specific data structures. In one embodiment, each data storage device 1140 may be a relational database. Some embodiments may provide interfaces that enable servers 1120 or clients 1130 to manage, e.g., retrieve, modify, add, or delete, the information stored in data storage devices 1140.

In various embodiments, each client 1130 may be an electronic device including hardware, software, or embedded logic components or a combination of two or more such components and capable of carrying out the appropriate functionalities implemented or supported by the client 1130. For example and without limitation, a client 1130 may be a desktop computer system, a notebook computer system, a netbook computer system, a handheld electronic device, or a mobile telephone. The present disclosure contemplates any suitable clients 1130. A client 1130 may enable a network user at client 1130 to access network 1130. A client 1130 may enable its user to communicate with other users at other clients 1130.

A client 1130 may have a web browser 1132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 1130 may enter a Uniform Resource Locator (URL) or other address directing the web browser 1132 to a server 1120, and the web browser 1132 may generate a Hyper Text Transfer Protocol (HTTP) request and communicate the HTTP request to server 1120. Server 1120 may accept the HTTP request and communicate to client 1130 one or more Hyper Text Markup Language (HTML) files responsive to the HTTP request. The web browser 1132 may render a web page based on the HTML files from server 1120 for presentation to the user. The present disclosure contemplates any suitable web page files. For example and without limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Exemplary Computer System for Anonymous Play Embodiments

Figure 11:
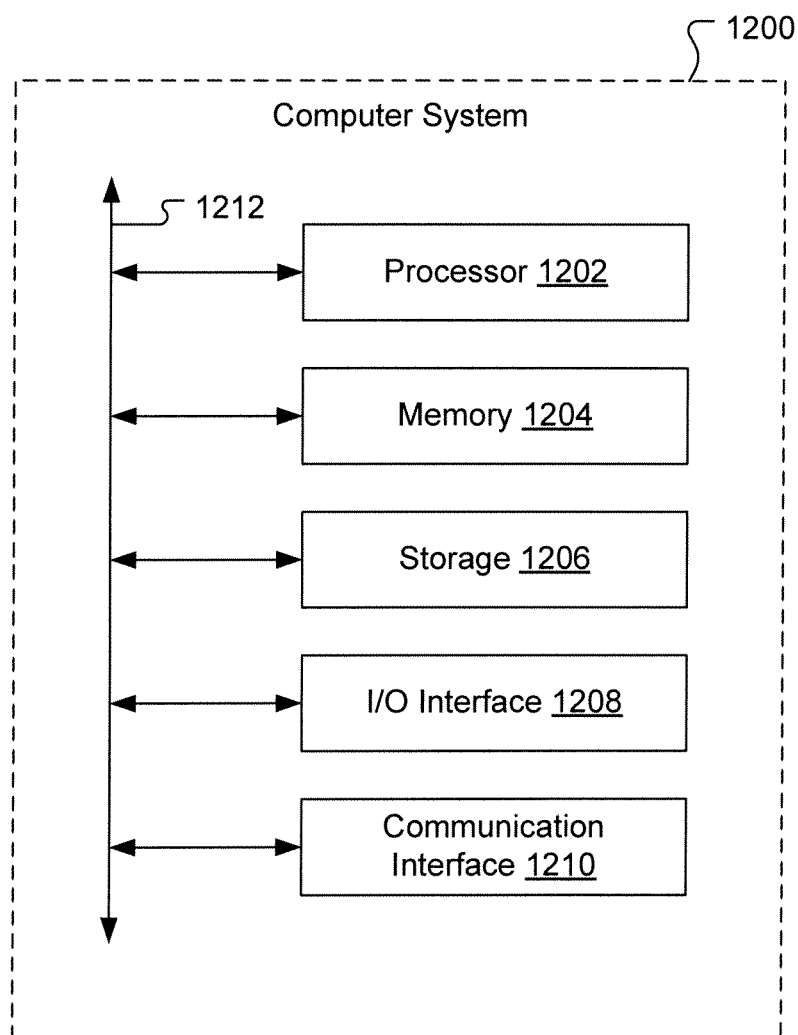
FIG. 11 shows an example computer system, in accordance with one embodiment of the present invention.

Particular embodiments may be implemented on one or more computer systems. FIG. 11 shows an example computer system 1200, in accordance with one embodiment of the present invention. In various embodiments, one or more computer systems 1200 perform one or more operations of one or more methods described or illustrated herein. In various embodiments, one or more computer systems 1200 provide functionality described or illustrated herein. In various embodiments, software running on one or more computer systems 1200 performs one or more operations of one or more methods described or illustrated herein or provides functionality described or illustrated herein. Also, some embodiments include one or more portions of one or more computer systems 1200.

This disclosure contemplates any suitable number of computer systems 1200. This disclosure contemplates computer system 1200 taking any suitable physical form. For example and without limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1200 may include one or more computer systems 1200; be unitary or distributed; span multiple locations; span multiple machines; or reside in a cloud, which may include one or more cloud components in one or more networks. Where appropriate, one or more computer systems 1200 may perform without substantial spatial or temporal limitation one or more operations of one or more methods described or illustrated herein. For example and without limitation, one or more computer systems 1200 may perform in real time or in batch mode one or more operations of one or more methods described or illustrated herein. One or more computer systems 1200 may perform at different times or at different locations one or more operations of one or more methods described or illustrated herein, where appropriate.

In various embodiments, computer system 1200 includes a processor 1202, memory 1204, storage 1206, an input/output (I/O) interface 1208, a communication interface 1210, and a bus 1212. Although this disclosure describes and illustrates a particular computer system 1200 having a particular number of particular components in a particular arrangement, this disclosure contemplates any suitable computer system having any suitable number of components of any required type in any suitable arrangement.

In various embodiments, processor 1202 includes hardware for executing instructions, such as those making up a computer program. For example and without limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In various embodiments, processor 1202 may include one or more internal caches for data, instructions, or addresses. The present disclosure contemplates processor 1202 including any suitable number of any suitable internal caches, where appropriate. For example and without limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. The present disclosure contemplates processor 1202 including any suitable number of any suitable internal registers, where appropriate. Also, where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. For example and without limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In various embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Also, where appropriate, this RAM may be dynamic RAM (DRAM) or static RAM (SRAM). Moreover, where appropriate, this RAM may be single-ported or multi-ported RAM. The present disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. For example and without limitation, storage 1206 may include an HDD, a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In various embodiments, storage 1206 is non-volatile, solid-state memory. In various embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Also, where appropriate, storage 1206 may include one or more storage 1206 components. Although this disclosure describes and illustrates particular storage, this disclosure contemplates any suitable storage.

In particular embodiments, I/O interface 1208 includes hardware, software, or both providing one or more interfaces for communication between computer system 1200 and one or more I/O devices. Computer system 1200 may include one or more of these I/O devices, where appropriate. One or more of these I/O devices may enable communication between a person and computer system 1200. For example and without limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. For example and without limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In various embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

As referred to herein, a computer-readable storage medium encompasses one or more non-transitory, tangible computer-readable storage media possessing structure(s). As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate.

This disclosure contemplates one or more computer-readable storage media implementing any suitable storage. In particular embodiments, a computer-readable storage medium implements one or more portions of processor 1202 (such as, for example, one or more internal registers or caches), one or more portions of memory 1204, one or more portions of storage 1206, or a combination of these, where appropriate. In various embodiments, a computer-readable storage medium implements RAM or ROM. In various embodiments, a computer-readable storage medium implements volatile or persistent memory. In various embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In various embodiments, software includes one or more application programming interfaces (APIs). This disclosure contemplates any suitable software written or otherwise expressed in any suitable programming language or combination of programming languages. In various embodiments, software is expressed as source code or object code. In various embodiments, software is expressed in a higher-level programming language, such as, for example, C, Perl, or a suitable extension thereof. In various embodiments, software is expressed in a lower-level programming language, such as assembly language (or machine code). In various embodiments, software is expressed in JAVA. In various embodiments, software is expressed in Hyper Text Markup Language (HTML), Extensible Markup Language (XML), or other suitable markup language.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A method for identity key management in networked application execution, comprising:
    transmitting an identifier request from a client system to a server system, wherein an identity key value in the identifier request is blank;
    upon detecting the blank identity key value at the server system, operating the server system to generate a new identity key value and an identifier for the new identity key value;
    transmitting the new identity key value and the identifier for the new identity key value from the server system to the client system;
    storing the new identity key value in a local store of the client system, wherein the local store of the client system is secured by a passcode, and wherein the new identity key value remains stored in the local store of the client system through power cycling of the client system; and using the identifier to track execution of a networked application.

2. The method as recited in claim 1, wherein the identity key value is a string value.

3. The method as recited in claim 1, wherein the identifier is a hash of the identity key value and a network identifier.

4. The method as recited in claim 1, wherein the new identity key value is generated as a random string value.

5. The method as recited in claim 1, wherein the passcode of the local store is a seed identifier issued by a manufacturer of the client system to a developer of the networked application.

6. The method as recited in claim 1, wherein the networked application is an on-line game application, and wherein the server system is a game server.

7. The method as recited in claim 6, wherein the client system is a mobile electronic device.

8. The method as recited in claim 1, wherein operating the server system to generate the new identity key value and the identifier for the new identity key value includes operating the server system to request a direct application programming interface to return the identifier for the new identity key value.

9. The method as recited in claim 8, wherein the direct application programming interface performs a lookup for the new identity key value in an identifier database.

10. The method as recited in claim 9, wherein the direct application programming interface does not find an identifier for the new identity key value in the identifier database, and wherein upon not finding the identifier for the new identity key value in the identifier database, the new identity key value is associated with an anonymous social network.

11. The method as recited in claim 10, wherein the identifier for the new identity key value is a function of the new identity key value and an identifier of the anonymous social network.

12. The method as recited in claim 11, wherein the identifier for the new identity key value is a hash of the new identity key value and an identifier of the anonymous social network.

13. The method as recited in claim 11, wherein the new identity key value associated with the identifier of the anonymous social network is made available for general use by applications installed on the client system.

14. The method as recited in claim 13, wherein the new identity key value associated with the identifier of the anonymous social network is used to obtain a saved application state from the server system.

15. The method as recited in claim 14, wherein the server system is a game server, and the saved application state is a saved game state.

16. The method as recited in claim 13, wherein the new identity key value associated with the identifier of the anonymous social network is used to make tracking calls.

17. The method as recited in claim 1, wherein the identity key value is for a global identity key.

18. The method as recited in claim 1, wherein the identity key value in the identifier request is blank because there is no global identity key available in the local store of the client system.

19. The method as recited in claim 1, wherein the new identity key value is stored in a developer portion of the local store of the client system.

20. The method as recited in claim 1, wherein the new identity key value is not publicly accessible on the client system.

* * * * *